(12) United States Patent
Mahalank et al.

(10) Patent No.: US 11,553,342 B2
(45) Date of Patent: Jan. 10, 2023

(54) METHODS, SYSTEMS, AND COMPUTER READABLE MEDIA FOR MITIGATING 5G ROAMING SECURITY ATTACKS USING SECURITY EDGE PROTECTION PROXY (SEPP)

(71) Applicant: Oracle International Corporation, Redwood Shores, CA (US)

(72) Inventors: Shashikiran Bhalachandra Mahalank, Bangalore (IN); Jay Rajput, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 81 days.

(21) Appl. No.: 16/929,048

(22) Filed: Jul. 14, 2020

(65) Prior Publication Data
US 2022/0022040 A1 Jan. 20, 2022

(51) Int. Cl.
*H04W 12/08* (2021.01)
*H04L 67/141* (2022.01)
*H04W 8/04* (2009.01)

(52) U.S. Cl.
CPC ........... *H04W 12/08* (2013.01); *H04L 67/141* (2013.01); *H04W 8/04* (2013.01)

(58) Field of Classification Search
CPC ........ H04W 12/08; H04W 8/04; H04L 67/141
See application file for complete search history.

(56) References Cited

U.S. PATENT DOCUMENTS 6,091,958 A 7/2000 Bergkvist et al.
6,151,503 A 11/2000 Chavez
(Continued)

FOREIGN PATENT DOCUMENTS

CN 101277541 A 10/2008
CN 10135561 A 1/2009
(Continued)

OTHER PUBLICATIONS

Communication of European publication number and information on the application of Article 67(3) EPC for European Patent Application Serial No. 19710842.6 (dated Apr. 21, 2021).
(Continued)

*Primary Examiner* — Michael A Keller
*Assistant Examiner* — Thao D Duong
(74) *Attorney, Agent, or Firm* — Jenkins, Wilson, Taylor & Hunt, P.A.

(57) ABSTRACT

A method for mitigating a 5G roaming attack using a security edge protection proxy (SEPP), includes receiving, at an SEPP, user equipment (UE) registration messages for outbound roaming subscribers. The method further includes creating, in a SEPP security database, UE roaming registration records derived from UE registration messages. The method further includes receiving, at the SEPP, a packet data unit (PDU) session establishment request message. The method further includes performing, using at least one parameter value extracted from the PDU session establishment request message, a lookup in the SEPP security database for a UE roaming registration record. The method further includes determining, by the SEPP and based on results of the lookup, whether to allow or reject the PDU session establishment request message.

18 Claims, 7 Drawing Sheets

(56) References Cited

U.S. PATENT DOCUMENTS

| | | |
|---|---|---|
| 6,292,666 B1 | 9/2001 | Siddiqui et al. |
| 6,308,075 B1 | 10/2001 | Irten et al. |
| 6,343,215 B1 | 1/2002 | Calabrese et al. |
| 6,591,101 B1 | 7/2003 | Shimbori |
| 7,043,754 B2 | 5/2006 | Arnouse |
| 7,567,661 B1 | 7/2009 | Wood et al. |
| 8,045,956 B2 | 10/2011 | Sun et al. |
| 8,145,234 B1 | 3/2012 | Leonard et al. |
| 8,509,074 B1 | 8/2013 | Roberts et al. |
| 8,615,217 B2 | 12/2013 | Ravishankar et al. |
| 8,879,431 B2 | 11/2014 | Ridel et al. |
| 9,015,808 B1 | 4/2015 | Koller et al. |
| 9,060,263 B1 | 6/2015 | Carames et al. |
| 9,106,428 B2 | 8/2015 | Matthews et al. |
| 9,106,769 B2 | 8/2015 | Kanode et al. |
| 9,191,803 B2 | 11/2015 | Patel et al. |
| 9,240,946 B2 | 1/2016 | Cai et al. |
| 9,374,840 B2 | 6/2016 | Monedero Recuero |
| 9,538,335 B1 | 1/2017 | Bank et al. |
| 9,628,994 B1 | 4/2017 | Gunyel et al. |
| 9,681,360 B1 * | 6/2017 | Salyers ............... H04W 12/64 |
| 9,912,486 B1 | 3/2018 | Sharifi Mehr |
| 10,009,751 B2 | 6/2018 | Gundavelli et al. |
| 10,021,738 B1 | 7/2018 | Mehta et al. |
| 10,212,538 B2 | 2/2019 | Russell |
| 10,237,721 B2 | 3/2019 | Gupta et al. |
| 10,306,459 B1 | 5/2019 | Patil et al. |
| 10,470,154 B2 | 11/2019 | Chellamani et al. |
| 10,511,998 B1 | 12/2019 | Vallur |
| 10,616,200 B2 | 4/2020 | Kumar et al. |
| 10,652,850 B2 | 5/2020 | Landais et al. |
| 10,834,045 B2 | 11/2020 | Mahalank et al. |
| 10,834,571 B1 * | 11/2020 | Yau ..................... H04W 12/06 |
| 10,931,668 B2 | 2/2021 | Mehta |
| 10,952,063 B2 | 3/2021 | Mehta |
| 10,984,128 B1 | 4/2021 | Hoffer |
| 2001/0046856 A1 | 11/2001 | McCann |
| 2002/0080752 A1 | 6/2002 | Johansson et al. |
| 2002/0098856 A1 | 7/2002 | Berg et al. |
| 2002/0181448 A1 | 12/2002 | Uskela et al. |
| 2002/0193127 A1 | 12/2002 | Martschitsch |
| 2003/0087647 A1 | 5/2003 | Hurst |
| 2004/0140908 A1 | 7/2004 | Gladwin et al. |
| 2005/0182968 A1 | 8/2005 | Izatt et al. |
| 2005/0232236 A1 | 10/2005 | Allison et al. |
| 2006/0068762 A1 | 3/2006 | Baldwin et al. |
| 2006/0193258 A1 | 8/2006 | Ballai |
| 2006/0211406 A1 | 9/2006 | Szucs et al. |
| 2006/0242414 A1 | 10/2006 | Corson et al. |
| 2007/0011261 A1 | 1/2007 | Madams et al. |
| 2007/0165527 A1 | 7/2007 | Sultan et al. |
| 2007/0165626 A1 | 7/2007 | Sultan et al. |
| 2007/0174082 A1 | 7/2007 | Singh |
| 2007/0223372 A1 | 9/2007 | Haalen et al. |
| 2007/0248032 A1 | 10/2007 | Vasudevan et al. |
| 2007/0281718 A1 | 12/2007 | Nooren |
| 2008/0004047 A1 | 1/2008 | Hill et al. |
| 2008/0020704 A1 | 1/2008 | Costa |
| 2008/0026778 A1 | 1/2008 | Cai et al. |
| 2008/0045246 A1 | 2/2008 | Murtagh et al. |
| 2008/0051061 A1 | 2/2008 | Takahashi |
| 2008/0125116 A1 | 5/2008 | Jiang |
| 2008/0168540 A1 * | 7/2008 | Agarwal ............ H04L 47/2483 726/5 |
| 2008/0207181 A1 | 8/2008 | Jiang |
| 2008/0222038 A1 | 9/2008 | Eden |
| 2008/0259798 A1 | 10/2008 | Loh et al. |
| 2009/0045251 A1 | 2/2009 | Jaiswal et al. |
| 2009/0168719 A1 * | 7/2009 | Mercurio ............. H04M 15/44 370/331 |
| 2009/0191915 A1 | 7/2009 | Abramson et al. |
| 2009/0195349 A1 | 8/2009 | Frader-Thompson et al. |
| 2010/0062789 A1 | 3/2010 | Agarwal et al. |
| 2010/0098414 A1 | 4/2010 | Kramer et al. |
| 2010/0100958 A1 | 4/2010 | Jeremiah |
| 2010/0105355 A1 | 4/2010 | Nooren |
| 2010/0130227 A1 | 5/2010 | Farthofer et al. |
| 2010/0161817 A1 | 6/2010 | Xiao et al. |
| 2010/0223222 A1 | 9/2010 | Zhou et al. |
| 2010/0235911 A1 | 9/2010 | Nooren |
| 2010/0240361 A1 | 9/2010 | Jiang |
| 2010/0313024 A1 | 12/2010 | Weniger et al. |
| 2011/0009085 A1 | 1/2011 | Albanes et al. |
| 2011/0014939 A1 | 1/2011 | Ravishankar et al. |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0124334 A1 | 5/2011 | Brisebois et al. |
| 2011/0158090 A1 | 6/2011 | Riley et al. |
| 2011/0173122 A1 | 7/2011 | Singhal |
| 2011/0191835 A1 | 8/2011 | Hawkes et al. |
| 2011/0217979 A1 | 9/2011 | Nas |
| 2011/0225091 A1 | 9/2011 | Plastina et al. |
| 2011/0307381 A1 | 12/2011 | Kim et al. |
| 2012/0099715 A1 | 4/2012 | Ravishankar et al. |
| 2012/0115512 A1 | 5/2012 | Grainger et al. |
| 2012/0131121 A1 | 5/2012 | Snyder et al. |
| 2012/0202481 A1 | 8/2012 | Martin |
| 2012/0203663 A1 | 8/2012 | Sinclair et al. |
| 2012/0207015 A1 | 8/2012 | Marsico |
| 2013/0035118 A1 | 2/2013 | Hamano et al. |
| 2013/0102231 A1 | 4/2013 | Joseph et al. |
| 2013/0102310 A1 | 4/2013 | Malonda |
| 2013/0171988 A1 | 7/2013 | Yeung et al. |
| 2013/0331063 A1 | 12/2013 | Cormier et al. |
| 2014/0195630 A1 | 7/2014 | Malik et al. |
| 2014/0199961 A1 | 7/2014 | Mohammed et al. |
| 2014/0199996 A1 | 7/2014 | Wang et al. |
| 2014/0259012 A1 | 9/2014 | Nandlall et al. |
| 2014/0280645 A1 | 9/2014 | Shuman et al. |
| 2014/0378129 A1 | 12/2014 | Jiang et al. |
| 2015/0012415 A1 | 1/2015 | Livne et al. |
| 2015/0038156 A1 | 2/2015 | Kilpatrick, II et al. |
| 2015/0094060 A1 | 4/2015 | Kouridakis et al. |
| 2015/0121078 A1 | 4/2015 | Fu et al. |
| 2015/0188979 A1 | 7/2015 | Almeras et al. |
| 2015/0304220 A1 | 10/2015 | Miyao |
| 2015/0304803 A1 * | 10/2015 | Chen ................. H04W 52/0209 455/41.2 |
| 2015/0341341 A1 | 11/2015 | Messerges |
| 2015/0350196 A1 | 12/2015 | Toyonaga et al. |
| 2016/0088461 A1 | 3/2016 | Jiang |
| 2016/0119773 A1 | 4/2016 | Xu et al. |
| 2016/0156647 A1 | 6/2016 | Engel et al. |
| 2016/0165432 A1 | 6/2016 | Dubesset et al. |
| 2016/0183178 A1 | 6/2016 | Marimuthu |
| 2016/0219043 A1 | 7/2016 | Blanke |
| 2016/0269566 A1 | 9/2016 | Gundamaraju et al. |
| 2016/0292687 A1 | 10/2016 | Kruglick |
| 2016/0365983 A1 | 12/2016 | Shahabuddin et al. |
| 2016/0381699 A1 | 12/2016 | Rubin et al. |
| 2017/0201778 A1 | 7/2017 | Bailey et al. |
| 2017/0244676 A1 | 8/2017 | Edwards |
| 2017/0245207 A1 | 8/2017 | Stammers et al. |
| 2017/0257866 A1 | 9/2017 | Chaudhuri et al. |
| 2017/0272921 A1 | 9/2017 | Kim et al. |
| 2017/0289048 A1 | 10/2017 | Chao et al. |
| 2017/0295201 A1 | 10/2017 | Peylo et al. |
| 2017/0345006 A1 | 11/2017 | Kohli |
| 2018/0020324 A1 | 1/2018 | Beauford |
| 2018/0109632 A1 | 4/2018 | Stammers et al. |
| 2018/0109953 A1 | 4/2018 | He |
| 2018/0167906 A1 | 6/2018 | Chellamani et al. |
| 2018/0205698 A1 | 7/2018 | Gupta et al. |
| 2018/0220301 A1 * | 8/2018 | Gallagher ............ H04W 4/021 |
| 2018/0288127 A1 | 10/2018 | Zaidi et al. |
| 2018/0288198 A1 | 10/2018 | Pope et al. |
| 2018/0310162 A1 | 10/2018 | Kim et al. |
| 2019/0007788 A1 | 1/2019 | Russell |
| 2019/0037484 A1 | 1/2019 | Davies et al. |
| 2019/0044932 A1 | 2/2019 | Kumar et al. |
| 2019/0074982 A1 | 3/2019 | Hughes |
| 2019/0182875 A1 * | 6/2019 | Talebi Fard ......... H04W 24/02 |
| 2019/0253885 A1 | 8/2019 | Bykampadi et al. |

(56) References Cited

U.S. PATENT DOCUMENTS

| | | |
|---|---|---|
| 2019/0306166 A1 | 10/2019 | Konda et al. |
| 2019/0342217 A1 | 11/2019 | Mazurek |
| 2019/0354709 A1 | 11/2019 | Brinskelle |
| 2020/0007538 A1 | 1/2020 | Mehta |
| 2020/0053044 A1 | 2/2020 | Mahalank et al. |
| 2020/0077260 A1 | 3/2020 | Hancock et al. |
| 2020/0107291 A1 | 4/2020 | Nayak et al. |
| 2020/0145432 A1* | 5/2020 | Verma ............... H04W 12/08 |
| 2020/0169510 A1 | 5/2020 | Kadosh et al. |
| 2020/0187089 A1 | 6/2020 | Meredith et al. |
| 2020/0221541 A1 | 7/2020 | Yan |
| 2020/0259896 A1 | 8/2020 | Sachs et al. |
| 2020/0329363 A1 | 10/2020 | Mehta |
| 2020/0344604 A1* | 10/2020 | He ....................... H04L 9/30 |
| 2021/0022070 A1 | 1/2021 | Letor et al. |
| 2021/0111985 A1 | 4/2021 | Mahalank et al. |
| 2021/0152494 A1 | 5/2021 | Johnsen et al. |
| 2021/0168751 A1 | 6/2021 | Stojanovski et al. |
| 2021/0176177 A1 | 6/2021 | Kubo et al. |
| 2021/0194903 A1 | 6/2021 | Medvedovsky et al. |
| 2021/0203636 A1 | 7/2021 | Kumar et al. |
| 2021/0234706 A1 | 7/2021 | Nair et al. |
| 2021/0250186 A1 | 8/2021 | Bykampadi et al. |
| 2021/0297942 A1 | 9/2021 | Bykampadi et al. |
| 2021/0321303 A1 | 10/2021 | Nair et al. |
| 2021/0377212 A1 | 12/2021 | Holtmanns et al. |
| 2021/0399988 A1 | 12/2021 | Labonte |
| 2021/0400538 A1* | 12/2021 | Ke .................. H04W 28/0257 |
| 2021/0406038 A1 | 12/2021 | Fetzer et al. |
| 2022/0021586 A1* | 1/2022 | Kazmierski ........... H04L 41/12 |
| 2022/0022027 A1* | 1/2022 | Xin ..................... H04W 8/12 |
| 2022/0030413 A1 | 1/2022 | Ben Henda et al. |
| 2022/0038394 A1 | 2/2022 | Anubolu et al. |
| 2022/0052847 A1 | 2/2022 | Gonzalez Cervantes et al. |
| 2022/0070674 A1 | 3/2022 | Russell |
| 2022/0104020 A1 | 3/2022 | Rajput |
| 2022/0104112 A1 | 3/2022 | Rajput |
| 2022/0124479 A1 | 4/2022 | Iddya |
| 2022/0150212 A1 | 5/2022 | Rajput |
| 2022/0159445 A1 | 5/2022 | Rajavelu |
| 2022/0191694 A1 | 6/2022 | Rajput |
| 2022/0201489 A1 | 6/2022 | Mahalank |

FOREIGN PATENT DOCUMENTS

| | | |
|---|---|---|
| CN | 101742445 A | 6/2010 |
| CN | 101917698 A | 12/2010 |
| CN | 102656845 A | 9/2012 |
| CN | 103179504 A | 6/2013 |
| CN | 103444212 A | 12/2013 |
| CN | 107 800 664 A | 3/2018 |
| CN | 110035433 A | 7/2019 |
| CN | 110800322 B | 5/2021 |
| CN | 201880040478.3 | 4/2022 |
| EP | 1 067 492 A2 | 1/2001 |
| EP | 1 906 682 A1 | 4/2008 |
| EP | 2 204 955 A1 | 7/2010 |
| EP | 2 785 125 B1 | 8/2018 |
| EP | 3 493 569 A1 | 6/2019 |
| EP | 3 646 630 B1 | 8/2021 |
| EP | 3 662 630 | 8/2021 |
| ES | 2 548 005 T3 | 10/2015 |
| JP | 7038148 B2 | 3/2022 |
| WO | WO 01/88790 A1 | 11/2001 |
| WO | WO 2005/091656 A1 | 9/2005 |
| WO | WO 2005/101872 A1 | 10/2005 |
| WO | WO 2007/084503 A2 | 7/2007 |
| WO | WO 2008/053808 A1 | 5/2008 |
| WO | WO-2010/021886 A1 | 2/2010 |
| WO | WO 2010/045646 A2 | 4/2010 |
| WO | WO 2010/105099 A2 | 9/2010 |
| WO | WO 2011/047382 A2 | 4/2011 |
| WO | WO 2016/201990 A1 | 12/2016 |
| WO | WO 2017/082532 A1 | 5/2017 |
| WO | WO 2018/202284 A1 | 11/2018 |
| WO | WO 2019/005287 A1 | 1/2019 |
| WO | WO 2019/027813 A1 | 2/2019 |
| WO | WO 2019/224157 A1 | 11/2019 |
| WO | WO 2020/013889 A1 | 1/2020 |
| WO | WO 2020/033113 A1 | 2/2020 |
| WO | WO 2020/036883 A1 | 2/2020 |
| WO | WO 2020/164763 A1 | 8/2020 |
| WO | WO 2020/179665 A1 | 9/2020 |
| WO | WO 2020/210015 A1 | 10/2020 |
| WO | WO 2020/257018 A1 | 12/2020 |
| WO | WO 2021/138072 A1 | 7/2021 |
| WO | WO 2022/046176 A1 | 3/2022 |
| WO | WO 2022/066227 | 3/2022 |
| WO | WO 2022/066228 A1 | 3/2022 |
| WO | WO 2022/086596 A1 | 4/2022 |
| WO | WO 2022/098404 A1 | 5/2022 |
| WO | WO 2022/103454 A1 | 5/2022 |
| WO | WO 2022/132315 A1 | 6/2022 |
| WO | WO 2022/132316 A1 | 6/2022 |

OTHER PUBLICATIONS

Decision to grant a European patent pursuant to Article 97(1) EPC for European Patent Application Serial No. 18756018.0 (dated Jul. 29, 2021).

Commonly-assigned, co-pending U.S. Appl. No. 17/129,441 for "Methods, Systems, and Computer Readable Media for Mitigating Spoofing Attacks on Security Edge Protection Proxy (SEPP) Inter-Public Land Mobile Network (INTER-PLMN) Forwarding Interface," (Unpublished, filed Dec. 21, 2020).

Commonly-assigned, co-pending U.S. Appl. No. 17/129,487 for "Methods, Systems, and Computer Readable Media for Ingress Message Rate Limiting," (Unpublished, filed Dec. 21, 2020).

Commonly-assigned, co-pending U.S. Appl. No. 17/125,943 for "Methods, Systems, and Computer Readable Media for Mitigating 5G Roaming Attacks for Internet of Things (IoT) Devices Based on Expected User Equipment (UE) Behavior Patterns," (Unpublished, filed Dec. 17, 2020).

Commonly-assigned, co-pending U.S. Appl. No. 17/123,038 for "Methods, Systems, and Computer Readable Media for Message Validation in Fifth Generation (5G) Communications Networks," (Unpublished, filed Dec. 15, 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).

Commonly-assigned, co-pending U.S. Appl. No. 17/099,683 for "Methods, Systems, and Computer Readable Media for Validating Location Update Messages," (Unpublished, filed Nov. 16, 2020).

Commonly-assigned, co-pending U.S. Appl. No. 17/095,420 for "Methods, Systems, and Computer Readable Media for Mitigating 5G Roaming Spoofing Attacks," (Unpublished, filed Nov. 11, 2020).

Notice of Allowance and Fee(s) Due and Examiner-Initiated Interview Summary for U.S. Appl. No. 16/379,488 (dated Oct. 23, 2020).

Commonly-assigned, co-pending U.S. Appl. No. 17/076,482 for "Methods, Systems, and Computer Readable Media for Validating a Session Management Function (SMF) Registration Request," (Unpublished, filed Oct. 21, 2020).

Notice of Allowance and Fee(s) Due and Examiner-Initiated Interview Summary for U.S. Appl. No. 16/024,422 (dated Oct. 21, 2020).

"3rd Generation Partnership Project; Technical Specification Group Services and System Aspects; Security architecture and procedures for 5G system (Release 16)," 3GPP TS 33.501, V16.4.0, pp. 1-249 (Sep. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).

"3rd Generation Partnership Project; Technical Specification Group Core Network and Terminals; 5G System; Authentication Server Services; Stage 3 (Release 16)," 3GPP TS 29.509, V16.5.0 pp. 1-60 (Sep. 2020).

"3rd Generation Partnership Project; Technical Specification Group Core Network and Terminals; 5G System; Network Function Reposi-

(56) References Cited

OTHER PUBLICATIONS tory Services; Stage 3 (Release 16)," 3GPP TS 29.510, V16.5.0, pp. 1-208 (Sep. 2020).
"3rd Generation Partnership Project; Technical Specification Group Core Network and Terminals; Numbering, addressing and identification; (Release 16)," 3GPP TS 23.003, V16.4.0, pp. 1-141 (Sep. 2020).
"3rd Generation Partnership Project; Technical Specification Group Core Network and Terminals; 5G System; Session Management Services; Stage 3 (Release 16)," 3GPP TS 29.502, V16.5.0, pp. 1-260 (Sep. 2020).
"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).
3rd Generation Partnership Project; Technical Specification Group Services and System Aspects; Procedures for the 5G System (5GS); Stage 2 (Release 16), 3GPP TS 23.502, V16.6.0, pp. 1-597 (Sep. 2020).
Notice of Allowance and Fee(s) Due and Examiner-Initiated Interview Summary for U.S. Appl. No. 16/100,172 (dated Sep. 14, 2020).
Commonly-assigned, co-pending U.S. Appl. No. 17/008,528 for "Methods, Systems, and Computer Readable Media for 5G User Equipment (UE) Historical Mobility Tracking and Security Screening Using Mobility Patterns," (Unpublished, filed Aug. 31, 2020).
First Office Action for Chinese Application Serial No. 201880040477.9 (dated Aug. 5, 2020).
"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-206 (Jul. 2020).
Notification of Transmittal of the International Search Report and the Written Opinion of the International Searching Authority, or the Declaration for International Application No. PCT/US2020/024234 (dated Jul. 16, 2020).
Non-Final Office Action for U.S. Appl. No. 16/379,488 (dated Jul. 15, 2020).
"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66 (Jul. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.3.0, pp. 1-86 (Jul. 2020).
"3rd Generation Partnership Project; Technical Specification Group Services and System Aspects; Security architecture and procedures for 5G system (Release 16)," 3GPP TS 33.501, V16.3.0, pp. 1-248 (Jul. 2020).
"3rd Generation Partnership Project; Technical Specification Group Core Network and Terminals; 5G System; Technical Realization of Service Based Architecture; Stage 3 (Release 16)," 3GPP TS 29.500 V16.4.0, pp. 1-79 (Jun. 2020).
"3rd Generation Partnership Project; Technical Specification Group Core Network and Terminals; 5G System; Network Data Analytics Services; Stage 3 (Release 16)," 3GPP TS 29.520 V16.4.0, pp. 1-91 (Jun. 2020).
Communication of European publication number and information on the application of Article 67(3) EPC for European Application Serial No. 18731923.1 (dated Apr. 8, 2020).
Sahu et al., "How 5G Registration Works," http://5gblogs.com/5g-registration/, 10 pages (Oct. 12, 2018).
Dierks et al., "The Transport Layer Security (TLS) Protocol Version 1.2," RFC 5246, pp. 1-208 (Aug. 2008).

Housley et al., "Internet X.509 Public Key Infrastructure Certificate and Certificate Revocation List (CRL) Profile," RFC 3280, pp. 1-258 (Apr. 2002).
Commonly-Assigned, co-pending U.S. Appl. No. 17/185,934 for "Methods, Systems, and Computer Readable Media for Mitigating Location Tracking and Denial of Service (DoS) Attacks that Utilize Access and Mobility Management Function (AMF) Location Service," (Unpublished, filed Feb. 25, 2021).
Communication under Rule 71(3) EPC Intention to grant for European Application Serial No. 18 756 018.0 (dated Feb. 24, 2021).
Commonly-Assigned, co-pending U.S. Appl. No. 17/175,260 for "Methods, Systems, and Computer Readable Media for Short Message Delivery Status Report Validation," (Unpublished, filed Feb. 12, 2021).
"3rd Generation Partnership Project; Technical Specification Group Services and System Aspects; Service requirements for the 5G system; Stage 1 (Release 18)," 3GPP TS 22.261, V18.1.1, pp. 1-85 (Jan. 2021).
"3rd Generation Partnership Project; Technical Specification Group Services and System Aspects; Procedures for the 5G System (5GS); Stage 2 (Release 16)," 3GPP TS 23.502, V16.7.1, pp. 1-603 (Jan. 2021).
Fajardo, V. et al., "Diameter Base Protocol, Internet Engineering Task Force (IETF)," RFC 6733, pp. 1-152 (Oct. 2012).
"3rd Generation Partnership Project; Technical Specification Group Core Network and Terminals; Numbering, addressing and identification; (Release 17)," 3GPP TS 23.003, V17.0.0, pp. 1-142 (Dec. 2020).
"3rd Generation Partnership Project; Technical Specification Group Services and System Aspects; Wireless and wireline convergence access support for the 5G System (5GS) (Release 16)," 3GPP TS 23.316, V16.6.0, pp. 1-83 (Dec. 2020).
"3rd Generation Partnership Project; Technical Specification Group Services and System Aspects; Security architecture and procedures for 5G system (Release 17)," 3GPP TS 33.501, V17.0.0, pp. 1-253 (Dec. 2020).
"3rd Generation Partnership Project; Technical Specification Group Core Network and Terminals; 5G System; Common Data Types for Service Based Interfaces; Stage 3 (Release 17)," 3GPP TS 29.571, V17.0.0, pp. 1-128 (Dec. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.5.0, pp. 1-98 (Dec. 2020).
"3rd Generation Partnership Project; Technical Specification Group Core Network and Terminals; 5G System; Location Management Services; Stage 3 (Release 16)," 3GPP TS 29.572, V16.5.0, pp. 1-77 (Dec. 2020).
"3rd Generation Partnership Project; Technical Specification Group Core Network and Terminals; 5G System; Access and Mobility Management Services; Stage 3 (Release 17)," 3GPP TS 29.518, V17.0.0, pp. 1-298 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
SMS Test Numbers: SMS Fake Delivery Receipts, Fake DLR— Tel!—SMS Test Platform and SMS services, Nov. 6, 2020, pp. 1-6, https://telqtele.com/sms-fake-delivery-receipts-fake-dlr/.
Communication of European publication number and information on the application of Article 67(3) EPC for European Application Serial No. 18756018.0 (dated May 13, 2020).
3rd Generation Partnership Project; Technical Specification Group Core Network and Terminals; T8 reference point for Northbound APIs, (Release 15), 3GPP TS 29.122, V15.6.0, pp. 1-300 (Dec. 2019).
DeKok, "The Network Access Identifier," Internet Engineering Task Force (IETF), RFC 7542, pp. 1-30 (May 2015).
Croft, N., "On Forensics: A Silent SMS Attack," Information and Computer Security Architectures (ICSA) Research Group, Department of Computer Science, pp. 1-4, University of Pretoria, South Africa (2012).

(56) References Cited

OTHER PUBLICATIONS

Constantin, L., "Remote SMS attack can force mobile phones to send premium-rate text messages: Applications installed by operators on SIM cards can be exploited remotely for SMS fraud and DoS purposes," IDG News Service, Dec. 19, 2011, pp. 1-5, IDG Communications, Inc., United States.
Non-Final Office Action for U.S. Appl. No. 16/024,422 (dated Jul. 8, 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-192 (Jul. 2020).
Applicant-Initiated Interview Summary for U.S. Appl. No. 16/100,172 (dated Jun. 9, 2020).
"3rd Generation Partnership Project; Technical Specification Group Services and System Aspects; Security architecture and procedures for 5G system (Release 16)," 3GPP TS 33.501, V16.2.0, pp. 1-227 (Mar. 2020).
"3rd Generation Partnership Project; Technical Specification Group Services and System Aspects; Procedures for the 5G System (5GS); Stage 2 (Release 16)," 3GPP TS 23.502, V16.4.0, pp. 1-582 (Mar. 2020).
Non-Final Office Action for U.S. Appl. No. 16/100,172 (dated Mar. 6, 2020).
Notice of Allowance and Fee(s) Due and Examiner-Initiated Interview Summary for U.S. Appl. No. 15/666,300 (dated Feb. 13, 2020).
Commonly-Assigned, co-pending U.S. Appl. No. 16/732,098 for "Methods, Systems, and Computer Readable Media for Implementing Indirect General Packet Radio Service (GPRS) Tunneling Protocol (GTP) Firewall Filtering Using Diameter Agent and Signal Transfer Point (STP)," (Unpublished, filed Dec. 31, 2019).
Advisory Action and Applicant-Initiated Interview Summary for U.S. Appl. No. 16/100,172 (dated Dec. 20, 2019).
"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V.16.1.0, pp. 1-17 (Dec. 2019).
"FS.19 Diameter Interconnect Security," GSMA, pp. 1-3 (Dec. 20, 2019).
Notification of Transmittal of the International Search Report and the Written Opinion of the International Searching Authority, or the Declaration for International Application Serial No. PCT/US2019/042203 (dated Nov. 11, 2019).
Applicant-Initiated Interview Summary for U.S. Appl. No. 15/666,300 (dated Oct. 29, 2019).
Final Office Action for U.S. Appl. No. 16/100,172 (dated Oct. 3, 2019).
"Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272, V16.0.0, pp. 1-180 (Sep. 2019).
"Technical Specification Group Core Network and Terminals; Policy and Charging Control (PCC); Reference points (Release 16)," 3GPP TS 29.212, V16.1.0, pp. 1-285 (Sep. 2019).
Notification of Transmittal of the International Search Report and the Written Opinion of the International Searching Authority, or the Declaration for International Application Serial No. PCT/US2019/028814 (dated Aug. 20, 2019).
Applicant-Initiated Interview Summary for U.S. Appl. No. 16/100,172 (dated Jul. 18, 2019).
Notice of Allowance and Fee(s) Due and Examiner-Initiated Interview Summary for U.S. Appl. No. 15/376,631 (dated Jul. 2, 2019).
"Technical Specification Group Core Network and Terminals; Mobile Application Part (MAP) specification (Release 15)," 3GPP TS 29.002, V15.5.0, pp. 1-1024 (Jun. 2019).
Non-Final Office Action for U.S. Appl. No. 15/666,300 (dated Jun. 27, 2019).

Decision on Appeal for U.S. Appl. No. 13/047,287 (Jun. 18, 2019).
Notification of Transmittal of the International Search Report and the Written Opinion of the International Searching Authority, or the Declaration for International Patent Application No. PCT/US2019/018990 (dated May 8, 2019).
Commonly-Assigned, co-pending U.S. Appl. No. 16/379,488 for "Methods, Systems, and Computer Readable Media for Dynamically Learning and Using Foreign Telecommunications Network Mobility Management Node Information for Security Screening," (Unpublished, filed Apr. 9, 2019).
Non-Final Office Action for U.S. Appl. No. 16/100,172 (dated Apr. 11, 2019).
Notice of Allowability for U.S. Appl. No. 16/035,008 (dated Mar. 18, 2019).
Notice of Allowance and Fee(s) Due for U.S. Appl. No. 16/035,008 (dated Jan. 18, 2019).
Advisory Action Before the Filing of an Appeal Brief and AFCP 2.0 Decision for U.S. Appl. No. 15/376,631 (dated Dec. 19, 2018).
Notice of Allowance and Fee(s) Due and Applicant-Initiated Interview Summary for U.S. Appl. No. 15/408,155 (dated Oct. 31, 2018).
Notification of Transmittal of the International Search Report and the Written Opinion of the International Searching Authority, or the Declaration for International Patent Application No. PCT/US2018/043985 (dated Oct. 9, 2018).
Final Office Action for U.S. Appl. No. 15/376,631 (dated Oct. 5, 2018).
Notice of Allowance and Fee(s) Due for U.S. Appl. No. 15/636,118 (dated Oct. 3, 2018).
Notification of Transmittal of the International Search Report and the Written Opinion of the International Searching Authority, or the Declaration for International Application No. PCT/US2018/030319 (dated Aug. 20, 2018).
Final Office Action for U.S. Appl. No. 15/408,155 (dated Jul. 26, 2018).
Notice of Allowance and Fee(s) Due for U.S. Appl. No. 15/636,118 (dated Apr. 27, 2018).
Non-Final Office Action for U.S. Appl. No. 15/376,631 (dated Apr. 18, 2018).
"Signalling Security in Telecom SS7/Diameter/5G," Enisa, pp. 1-30 (Mar. 2018).
Examiner's Answer for U.S. Appl. No. 13/047,287 (dated Feb. 26, 2018).
Advisory Action Before the Filing of an Appeal Brief and AFCP 2.0 Decision for U.S. Appl. No. 15/376,631 (dated Feb. 2, 2018).
Non-Final Office Action for U.S. Appl. No. 15/408,155 (dated Jan. 9, 2018).
Final Office Action for U.S. Appl. No. 15/376,631 (dated Nov. 28, 2017).
"GSMA Guidelines for Diameter Firewall," NetNumber Inc., pp. 1-7 (Sep. 12, 2017).
"Oracle Communications Diameter Signaling Router Main Differentiators," Oracle White Paper, pp. 1-10 (Jul. 2017).
"LTE and EPC Roaming Guidelines," GSM Association, Official Document IR.88, V 16.0, pp. 1-90 (Jul. 5, 2017).
Non-Final Office Action for U.S. Appl. No. 15/376,631 (dated Jun. 16, 2017).
"LTE International Roaming Whitepaper," http://carrier.huawei.com/en/technical-topics/core-network/lte-roaming-whitepaper, pp. 1-16 (Downloaded May 12, 2017).
"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).
Final Office Action for U.S. Appl. No. 13/047,287 (dated Mar. 10, 2017).
"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
"Digital cellular telecommunications system (Phase 2+) (GSM); Universal Mobile Telecommunications System (UMTS); LTE; Cx

(56) References Cited

OTHER PUBLICATIONS and Dx interfaces based on the Diameter protocol; Protocol details (3GPP TS 29.229 V 13.1.0 Release 13)," ETSI TS 129 229 V13.1.0, pp. 1-42 (Jan. 2017).
"Edge Router (DEA)," http://www.mavenir.com/our-products/mobile/edge-router-dea, pp. 1-7 (Copyright 2017).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).
"Syniverse Guide to LTE Roaming and Interoperability," https://www.syniverse.com/assets/files/custom_content/lte-roaming-interoperability-guide.pdf, pp. 1-11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLS interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).
Kotte, "Analysis and Experimental Verification of Diameter Attacks in Long Term Evolution Networks," http://www.diva-portal.org/smash/get/diva2:951619/FULLTEXT01.pdf, pp. 1-72 (2016).
Advisory Action Before the Filing of an Appeal Brief for U.S. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015).
Final Office Action for U.S. Appl. No. 13/047,287 (dated Jun. 4, 2015).
"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9),"ETSI TS 129 172, V9.6.0, pp. 1-27 (Apr. 2015).
"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)," ETSI TS 129 173, V12.2.0., p. 1-20 (Oct. 2014).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).
"Digital cellular telecommunications system (Phase 2+); Universal Monile Telecommunications System (UMTS); LTE; Location Services (LCS); Service description; Stagel (3GPP TS 22.071 V 11.0.0 Release 11," ETSI TS 122 071 V11.0.0, pp. 1-50 (Oct. 2012).
Restriction and/or Election Requirement for U.S. Appl. No. 12/823,559 (dated Aug. 27, 2012).
Notice of Allowance and Fee(s) due for U.S. Appl. No. 12/581,739 (dated Aug. 8, 2012).
Non-Final Office Action for U.S. Appl. No. 13/047,287 (dated Jun. 6, 2012).

Notice of Allowance and Fee(s) Due and Examiner-Initiated Interview Summary for U.S. Appl. No. 12/581,739 (dated May 15, 2012).
Non-Final Office Action for U.S. Appl. No. 12/722,460 (dated Apr. 9, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
"Net-Net Diameter Director," http://www.oracle.com/us/industries/communications/net-net-diameter-director-ds-1985034.pdf, pp. 1-9 (Copyright 2012).
Final Office Action for U.S. Appl. No. 12/581,739 (dated Dec. 30, 2011).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Non-Final Office Action for U.S. Appl. No. 12/581,739 (dated Aug. 26, 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).
"Solution: Itron CENTRON GPRS," Data Sheet, http://www.smartsynch.com/SmartSynch_itron_centron.htm, pp. 1-3 (Downloaded from the Internet on Jul. 5, 2011).
Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).
Notification of Transmittal of the Internatioanl Search Report and the Written Opinion of the International Searching Authority, or the Declaration for International Application No. PCT/US2010/027043 (dated Oct. 19, 2010).
"Draft LS on network verification of UE provided location," 3GPP TSG SA WG2 Meeting #81, pp. 1 (Oct. 11-15, 2010).
Notification of Transmittal of the International Search Report and the Written Opinion of the International Searching Authority, or the Declaration for International Application No. PCT/US2009/061187 (dated May 17, 2010.
Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).
"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).
"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).
"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).
3rd Generation Partnership Project "Technical Specification Group Core Network and Terminals; Study into routing of MT-SMs via the HPLMN (Release 7)," 3GPP TR 23.840 V7.1.0 (Mar. 2007).

(56) References Cited

OTHER PUBLICATIONS

Hakala et al., "Diameter Credit-Control Application," RFC 4006, pp. 1-115 (Aug. 2005).
Decision to grant a European patent pursuant to Article 97(1) EPC for European Patent Application Serial No. 18731923.1 (dated Jul. 15, 2021).
Notification of Transmittal of the International Search Report and the Written Opinion of the International Searching Authority, or the Declaration for International Application No. PCT/US2021/029977 (dated Jul. 9, 2021).
Notification of Transmittal of the International Search Report and the Written Opinion of the International Searching Authority, or the Declaration for International Application No. PCT/US2021/029973 (dated Jul. 7, 2021).
Notification of Transmittal of the International Search Report and the Written Opinion of the International Searching Authority, or the Declaration for International Application No. PCT/US2021/024002 (dated Jun. 29, 2021).
Notification of Transmittal of the International Search Report and the Written Opinion of the International Searching Authority, or the Declaration for International Application No. PCT/US2021/024980 (dated Jun. 23, 2021).
"3rd Generation Partnership Project; Technical Specification Group Services and System Aspects; Security Aspects; Study on security aspects of the 5G Service based Architecture (SBA) (Release 16)," 3GPP TR 33.855, V16.0.0, pp. 1-104 (Jul. 2020).
"3rd Generation Partnership Project; Technical Specification Group Services and System Aspects; Security Assurance Specification (SCAS) threats and critical assets in 3GPP network product classes (Release 16)," 3GPP TR 33.926, V16.3.0, pp. 1-60 (Mar. 2020).
"New Annex for the SEPP in TR 33.926," 3GPP TSG-SA WG3 Meeting #95-BIS, pp. 1-6 (Jun. 24-28, 2019).
"N32 message anti-spoofing within the SEPP," 3GPP TSG SA WG3 (Security), Meeting #91, pp. 1-2 (Apr. 16-20, 2018).
Communication of European publication number and information on the application of Article 67(3) EPC for European Patent Application Serial No. 19730571.7 (dated Apr. 8, 2021).
International Search Report for International Patent Application Serial No. PCT/US2020/065763 (dated Apr. 6, 2021).
First Examination Report for Indian Patent Application Serial No. 201947047367 (dated Mar. 31, 2021).
Notice of Allowance for Chinese Patent Application Serial No. 201880040477.9 (dated Mar. 29, 2021).
Communication under Rule 71 (3) EPC Intention to Grant for European Patent Application Serial No. 18 731 923.1 (dated Mar. 22, 2021).
First Examination Report for Indian Patent Application Serial No. 201947047012 (dated Mar. 18, 2021).
Notification of Transmittal of the International Search Report and the Written Opinion of the International Searching Authority, or the Declaration for International Application No. PCT/US2022/013373 (dated Apr. 11, 2022).
Notice of Allowance for U.S. Appl. No. 16/732,098 (dated Apr. 6, 2022).
Examination Report for Indian Application Serial No. 202147030053 (dated Mar. 22, 2022).
Notification of Transmittal of the International Search Report and the Written Opinion of the International Searching Authority or the Declaration for International Application No. PCT/US2021/057156 (dated Mar. 3, 2022).
Non-Final Office Action for Chinese Application Serial No. 202080007649.X (dated Mar. 2, 2022).
Non-Final Office Action for U.S. Appl. No. 17/076,482 (dated Apr. 1, 2022).
Nokia et al., "Support of the mapping from IP addressing information provided to an AF to the user identity," 3GPP SA WG2 Meeting #142e pp. 1-3 (Nov. 16-20, 2020).
China Telecom, "KI #13, New Sol: Trigger Procedures for Requesting Analytics," 3GPP SA WG2 Meeting #S2-139E pp. 1-4 (Aug. 19-Sep. 2, 2020).

First Office Action for Japanese Application Serial No. 2021545918 (dated Mar. 8, 2022).
Non-Final Office Action for U.S. Appl. No. 17/129,487 (dated Mar. 21, 2022).
Decision to grant a European patent pursuant to Article 97(1) EPC for European Patent Application Serial No. 19710842.6 (dated Feb. 24, 2022).
Notice of Allowance for Chinese Application Serial No. 201880040478.3 (dated Feb. 28, 2022).
Notice of Allowance for Japanese Application Serial No. 2019572174 (dated Feb. 8, 2022).
Final Office Action for U.S. Appl. No. 17/099,683 (dated Feb. 15, 2022).
Notification of Transmittal of the International Search Report and the Written Opinion of the International Searching Authority, or the Declaration for International Application No. PCT/US2021/057157 (dated Jan. 27, 2022).
Examination Report for Indian Application Serial No. 202147005810 (dated Jan. 24, 2022).
Examination Report for Indian Application Serial No. 202147001641 (dated Jan. 13, 2022).
Examination Report for Indian Application Serial No. 202047056970 (dated Jan. 13, 2022).
Commonly-Assigned, co-pending U.S. Appl. No. 17/319,023 for "Methods, Systems, and Computer Readable Media for Conducting a Velocity Check for Outbound Subscribers Roaming to Neighboring Countries," (Unpublished, May 12, 2021).
Nokia et al., "3gpp-Sbi-Consumer-Id," 3GPP TSG-CT WG4 Meeting #101e pp. 1-4 (Nov. 3-13, 2020).
Nokia et al., "SBA Network Function certificate profile," 3GPTT TSG-SA WG3 Meeting #98e pp. 1-5 (Mar. 2-6, 2020).
"3rd Generation Partnership Project; Technical Specification Group Services and System Aspects; Security Aspects; Study on security aspects of the 5G Service Based Architecture (SBA) (Release 16)," 3GPP TR 33.855, V1.3.0 pp. 1-52 (Nov. 2018).
Notification of Transmittal of the International Search Report and the Written Opinion of the International Searching Authority, or the Declaration for International Application No. PCT/US2021/042660 (dated Oct. 26, 2021).
Hearing Notice of Indian Application Serial No. 201947047367 (Oct. 11, 2021).
First Office Action for Japanese Application Serial No. 2019572174 (dated Sep. 14, 2021).
Notification of Transmittal of the International Search Report and the Written Opinion of the International Searching Authority, or the Declaration for International Application No. PCT/US2021/033030 (dated Aug. 20, 2021).
First Office Action for Chinese Application Serial No. 201880040478.3 (dated Aug. 26, 2021).
Notification Concerning Availability of the Publication of the International Application for International Application No. PCT/US2020/065763 (dated Jul. 8, 2021).
Non-Final Office Action for U.S. Appl. No. 17/099,683 (dated Sep. 20, 2021).
"KI#13, New Sol: Trigger Procedures for Request Analytics," China Telecom, SA WG2 Meeting #S2-139E, pp. 1-4 (Aug. 19-Sep. 2, 2020).
"5G; Procedures for the 5G System (3GPP TS 23.502 version 15.3.0 Release 15)," ETSI TS 123 502, V15.3.0, pp. 1-330 (Sep. 2018).
Non-Final Office Action for U.S. Appl. No. 17/009,683 (dated Jul. 15, 2022).
Decision to grant a European patent pursuant to Article 97(1) EPC for European Patent Application Serial No. 19710842.6 (dated Jun. 30, 2022).
Notice of Allowance for Chinese Application Serial No. 202080007649.X (dated Jun. 20, 2022).
Communication under Rule 71(3) EPC Intention to Grant for European Patent Application Serial No. 19 749 059.2 (dated May 16, 2022).
Notification of Transmittal of the International Search Report and the Written Opinion of the International Searching Authority or the Declaration for International Application No. PCT/US2021/042853 (dated Oct. 18, 2021).

(56) References Cited

OTHER PUBLICATIONS

Advisory Action and Applicant-Initiated Interview Summary for U.S. Appl. No. 17/099,683 (dated May 23, 2022).
"Edge Router (DEA)," Mavenir, pp. 1-7 (2017).
Press Release, "Echelon and T-Mobile Announce Alliance to Reduce the Cost of a Secure Smart Grid Network for Utilities," Echelon Corp., https://www.tdworld.com/smart-utility/article/20956244/echelon-and-tmobile-announce-alliance-to-reduce-the-cost-of-a-secure-smart-grid-network-for-utilities, p. 1-10 (May 14, 2009).

* cited by examiner

METHODS, SYSTEMS, AND COMPUTER READABLE MEDIA FOR MITIGATING 5G ROAMING SECURITY ATTACKS USING SECURITY EDGE PROTECTION PROXY (SEPP)

TECHNICAL FIELD

The subject matter described herein relates to mitigating 5G roaming security attacks. More particularly, the subject matter described herein relates to methods, systems, and computer readable media for mitigating 5G roaming security attacks using an SEPP.

BACKGROUND

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is a combination of Internet protocol (IP) address and port number on a network node that hosts a producer NF. Producer NFs register with a network function repository function (NRF). The NRF maintains an NF profile of available NF instances and their supported services. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the service communications proxy, and the service communication proxy load balances traffic among producer NF service instances that provide the required service or directly routes the traffic to the destination producer NF.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages.

The service gateway is a node that sits in front of a group of producer NFs that provide a given service. The service gateway may load balance incoming service requests among the producer NF that provide the service in a manner similar to the SCP.

The service mesh is a name for a group of intermediate proxy nodes that enable communications between producer and consumer NFs. The service mesh may include one or more SCPs, SEPPs, and service gateways.

One problem with the existing Third Generation Partnership Project (3GPP) service architecture is that modes in the 5G network are subject to denial of service (DoS) attacks for messaging concerning outbound roaming subscribers. An outbound roaming subscriber is a subscriber of an operator's network that is roaming in a visited network. Normal messaging for legitimate outbound roaming subscribers involves authentication, signaling for authenticating the subscriber, followed by registration signaling for registering the subscriber to operate in the visited network. When the subscriber attempts to establish a packet data unit (PDU) session, PDU session establishment signaling is routed to the unified data management (UDM) function in the home network for authorization.

One problem with this architecture is that the home network does not authenticate PDU session establishment requests before forwarding the requests to the unified data management function and the home network. An attacker can repeatedly send fake PDU session establishment requests and overwhelm the UDM in the home network.

Accordingly, in light of these difficulties there exists a need for methods, systems, and computer readable media for mitigating 5G roaming security attacks using an SEPP.

SUMMARY

A method for mitigating a 5G roaming attack using a security edge protection proxy (SEPP), includes receiving, at an SEPP, user equipment (UE) registration messages for outbound roaming subscribers. The method further includes creating, in a SEPP security database, UE roaming registration records derived from UE registration messages. The method further includes receiving, at the SEPP, a packet data unit (PDU) session establishment request message. The method further includes performing, using at least one parameter value extracted from the PDU session establishment request message, a lookup in the SEPP security database for a UE roaming registration record. The method further includes determining, by the SEPP and based on results of the lookup, whether to allow or reject the PDU session establishment request message.

According to another aspect of the subject matter described herein, receiving the UE registration messages for the outbound roaming subscribers includes receiving $N_{udm}$_UECM_Registration messages from access management functions (AMFs) and session management functions (SMFs) serving the outbound roaming subscribers.

According to yet another aspect of the subject matter described herein, creating records in the SEPP security database includes creating records that each include a subscription permanent identifier (SUPI) or subscription concealed identifier (SUCI), serving public land mobile network (PLMN) ID, and access type.

According to yet another aspect of the subject matter described herein, receiving a PDU session establishment request message includes receiving a PDU session establishment request message including a SUPI or SUCI, an PLMN ID, and an access type.

According to yet another aspect of the subject matter described herein, performing the lookup in the SEPP security database include performing the lookup using the SUPI or SUCI from the PDU session establishment request message.

According to yet another aspect of the subject matter described herein, the method for mitigating 5G roaming security attacks for outbound mobile subscribers includes failing to locate a record corresponding to the SUPI or SUCI from the PDU session establishment request message in the SEPP security database, where determining whether to allow or reject the PDU session establishment request message includes determining to reject the PDU session establishment request message, and further comprising rejecting the PDU session establishment request message.

According to yet another aspect of the subject matter described herein, the method for mitigating 5G roaming security attacks for outbound mobile subscribers includes locating a record corresponding to the SUPI or SUCI from the PDU session establishment request message in the SEPP security database, determining that a PLMN ID or an access type in the record does not match the PLMN ID or the access type in the PDU session establishment request message, where determining whether to allow or reject the PDU session establishment request message includes determining to reject the PDU session establishment request message, and the method for mitigating 5G roaming securing attacks further includes rejecting the PDU session establishment request message.

According to yet another aspect of the subject matter described herein, rejecting the PDU session establishment request message includes discarding the PDU session establishment request message and sending a PDU session establishment error response.

According to yet another aspect of the subject matter described herein, the method for mitigating 5G roaming security attacks for outbound mobile subscribers includes locating a record corresponding to the SUPI or SUCI from the PDU session establishment request message in the SEPP security database, determining that a PLMN ID and an access type in the record matches the PLMN ID and the access type in the PDU session establishment request message, where determining whether to allow or reject the PDU session establishment request message includes determining to allow the PDU session establishment request message, and the method for mitigating 5G roaming security attacks further includes allowing the PDU session establishment request message.

According to yet another aspect of the subject matter described herein, the method for mitigating 5G roaming security attacks for outbound mobile subscribers includes allowing the PDU session establishment request message by forwarding the PDU session establishment request message from the SEPP to a home session management function (hSMF).

According to another aspect of the subject matter described herein, a system for mitigating a 5G roaming attack includes a security edge protection proxy (SEPP) including at least one processor and a memory. The system further includes an SEPP security database implemented in the memory. The system further includes an SEPP roaming security controller implemented by the at least one processor for receiving user equipment (UE) registration messages for outbound roaming subscribers, creating, in the SEPP security database, UE roaming registration records derived from UE registration messages, receiving a packet data unit (PDU) session establishment request, performing, using at least one parameter value extracted from the PDU session establishment request message, a lookup in the SEPP security database for a UE roaming registration record, and determining, by the SEPP and based on results of the lookup, whether to allow or reject the PDU session establishment request message.

According to yet another aspect of the subject matter described herein, the SEPP roaming security controller is configured to receive $N_{udm}$_UECM_Registration messages from access and mobility management functions (AMFs) and session management functions (SMFs) serving the outbound roaming subscribers.

According to yet another aspect of the subject matter described herein, the SEPP roaming security controller is configured to create the records in the SEPP security database where each includes a subscription permanent identifier (SUPI) or subscription concealed identifier (SUCI), serving public land mobile network (PLMN) ID, and access type.

According to yet another aspect of the subject matter described herein, the PDU session establishment request message includes a SUPI or SUCI, an PLMN ID, and an access type.

According to yet another aspect of the subject matter described herein, the SEPP roaming security controller is configured to perform the lookup in the SEPP security database using the SUPI or SUCI from the PDU session establishment request message.

According to yet another aspect of the subject matter described herein, the SEPP roaming security controller is configured to, in response to failing to locate a record corresponding to the SUPI or SUCI from the PDU session establishment request message in the SEPP security database, reject the PDU session establishment request message.

According to yet another aspect of the subject matter described herein, the SEPP roaming security controller is configured to, in response to locating a record corresponding to the SUPI or SUCI from the PDU session establishment request message in the SEPP security database and determining that a PLMN ID or an access type in the record does not match the PLMN ID or the access type in the PDU session establishment request message, reject the PDU session establishment request message.

According to yet another aspect of the subject matter described herein, the SEPP roaming security controller is configured to reject the PDU session establishment request message by discarding the PDU session establishment request message and sending a PDU session establishment error response.

According to yet another aspect of the subject matter described herein, the SEPP roaming security controller is configured to, in response to locating a record corresponding to the SUPI or SUCI from the PDU session establishment request message in the SEPP security database, determining that a PLMN ID and an access type in the record does match the PLMN ID and the access type in the PDU session establishment request message, allow the PDU session establishment request message, wherein allowing the PDU session establishment request message includes forwarding the PDU session establishment request message from the SEPP to a home session management function (SMF).

According to yet another aspect of the subject matter described herein, a non-transitory computer readable medium having stored thereon executable instructions that when executed by a processor of a computer control the computer to perform steps is described. The steps include, receiving, at a security edge protection proxy (SEPP), user equipment (UE) registration messages for outbound roaming subscribers. The steps further include creating, in a SEPP security database, UE roaming registration records derived from UE registration messages. The steps further include receiving, at the SEPP, a packet data unit (PDU) session establishment request message. The steps further include performing, using at least one parameter value extracted from the PDU session establishment request, a lookup in the SEPP security database for a UE roaming registration record. The steps further include determining, by the SEPP and based on results of the lookup, whether to allow or reject the PDU session establishment request message.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
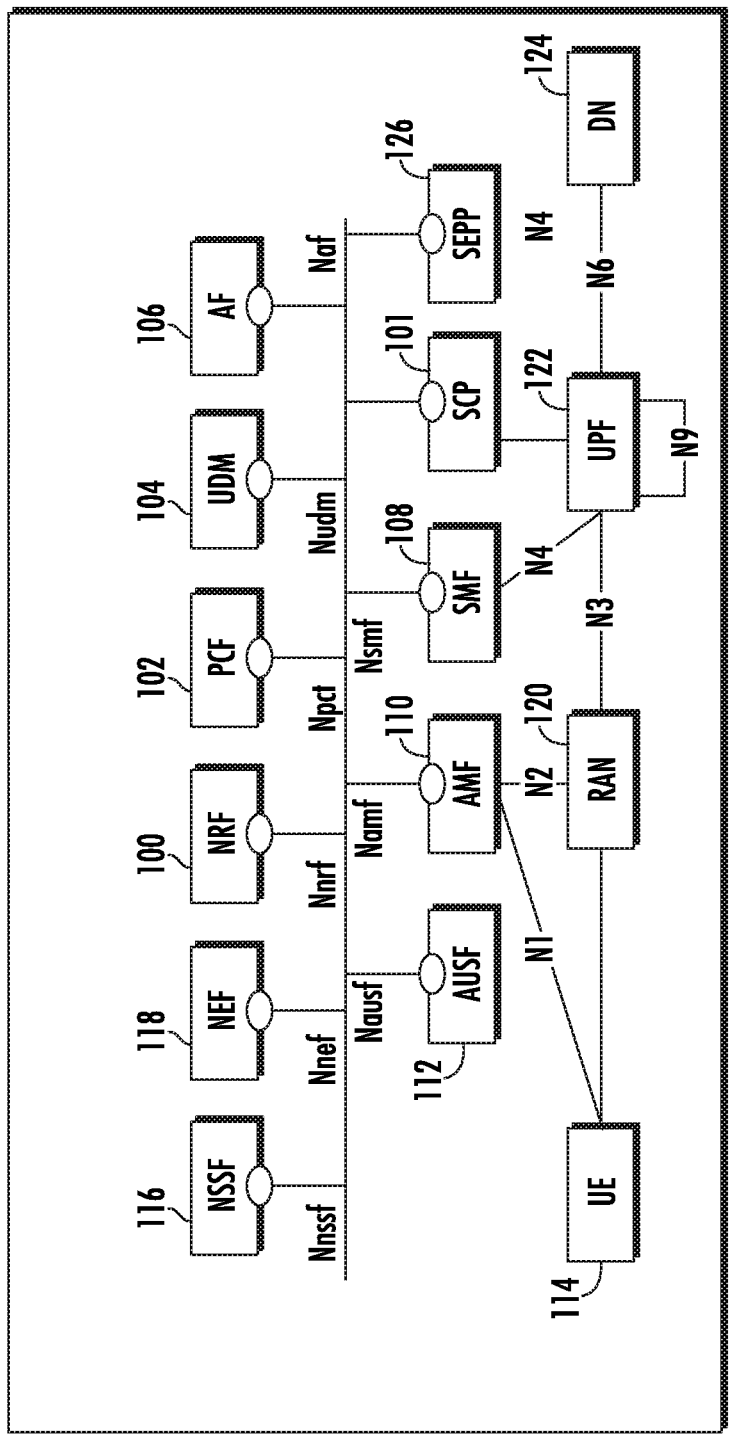
FIG. 1 is a network diagram illustrating an exemplary 5G network architecture.

The subject matter described herein relates to methods, systems, and computer readable media for mitigating 5G roaming security attacks using an SEPP. FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NFs. In addition, SCP 101 may perform load balancing of connections between consumer and producer NFs.

NRF 100 is a repository for NF profiles. In order to communicate with a producer NF, a consumer NF or an SCP must obtain the NF profile from NRF 100. The NF profile is a JavaScript object notation (JSON) data structure defined in 3GPP TS 29.510. The NF profile definition includes at least one of a fully qualified domain name (FQDN), an Internet protocol (IP) version 4 (IPv4) address or an IP version 6 (IPv6) address.

In FIG. 1, any of the nodes (other than SCP 101 and NRF 100) can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as UE 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. As will be described in detail below, SEPP 126 may be used to mitigate 5G roaming security attacks for outbound roaming subscribers by performing an authorization lookup for incoming PDU session establishment requests for outbound roaming subscribers and for disallowing requests from entering the home network when the authorization lookup fails.

Figure 2:
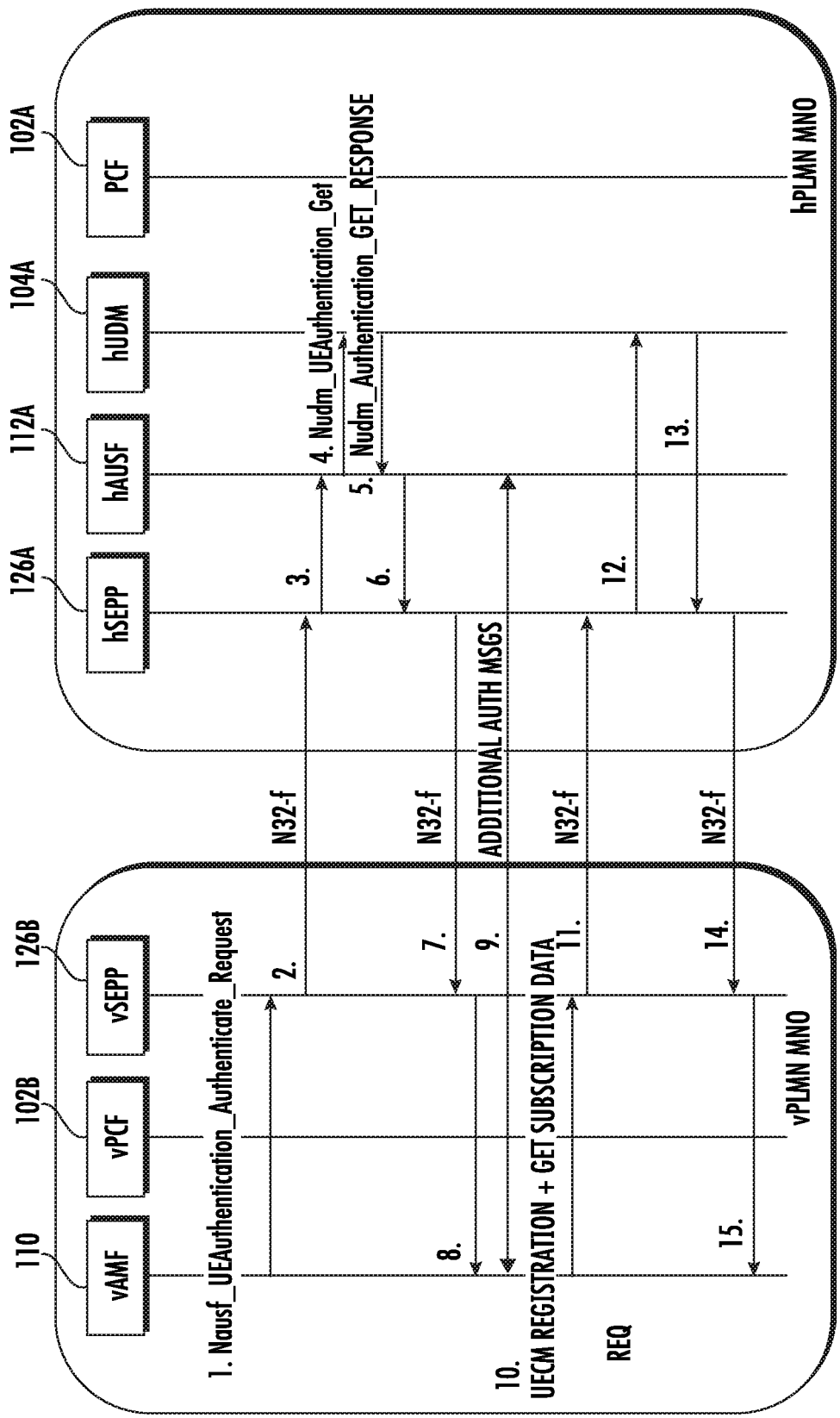
FIG. 2 is a flow diagram illustrating UDM registration for an outbound roaming subscriber.

The interface that SEPP 126 uses to connect with SEPPs in other networks is the N32-f interface. The N32-f interface that an attacker can exploit to send fake PDU session establishment requests. However, before illustrating a fake PDU session establishment request scenario, registration and authentication signaling that is transmitted over the N32-f interface will now be described. FIG. 2 is a call flow diagram illustrating UE registration signaling for an outbound roaming subscriber that is exchanged between a home SEPP and a visited SEPP over the N32-f interface. Referring to FIG. 2, home SEPP 126A sits at the edge of a subscriber's home network and receives signaling from a visited network for an outbound roaming subscriber. Home network also includes home AUSF 112A, home UDM 104A, and home PCF 102A. A visited network includes visited SEPP 126B, visited PCF 102B, and visited AMF 110.

Referring to the signaling message flow in FIG. 2, in line 1, when a UE moves into an area served by visited AMF 110, visited AMF 110 sends an $N_{ausf}$_UE_Authentication_Authenticate request message to the home AUSF 112A in the roaming subscriber's home network. The $N_{ausf}$_UE_Authentication_Authenticate_Request message may contain either the subscription concealed identifier (SUCI) or the subscription permanent identifier (SUFI). The $N_{ausf}$_UE_Authentication_Authenticate_Request message also includes the serving network name or VPLMN ID. The $N_{ausf}$_UE_Authentication_Authenticate_Request message may also identify the access type, i.e., whether the access is 3GPP or non-3GPP. As will be described in further detail below, home SEPP 126A may use a combination of the SUPI, the serving network name or VPLMN ID, and the access type to authorize or not authorize PDU session establishment requests. However, such functionality is not specified as part of the SEPP functionality in 3GPP TS 33.501, which defines the security architecture for the 5G system.

Visited SEPP 126B receives the $N_{ausf}$_UE_Authentication_Authenticate_Request message and forwards the message to home SEPP 126A over the N32-f interface. Home SEPP 126A forwards the message to home AUSF 112A.

Upon receiving the $N_{ausf}$_UE_Authentication_Authenticate_Request message, home AUSF 112A determines whether the requesting AMF or security anchor function (SAF) in the serving network is entitled to using the serving network named in the $N_{ausf}$_UE_Authentication_Authenticate_Request by comparing the serving network name with the expected serving network name. Home AUSF 112A stores the received serving network name temporarily. If the serving network is not authorized to use the serving network identified by the serving network name, home AUSF 112A will respond with certain "serving network not authorized" in an $N_{ausf}$_UE_Authentication_Authenticate_Response message.

In the illustrated example, it is assumed that the serving network name in the $N_{ausf}$_UE_Authentication_Authenticate_Request matches the expected serving network name. Accordingly, home AUSF 112A sends an $N_{udm}$_UE_Authentication_Get_Request to home UDM 104A. The home $N_{udm}$_UE_Authentication_Get_Request message includes the SUCI or SUPI and the serving network name.

Upon receipt of the $N_{udm}$_UE_Authentication_Get_Request message, home UDM 104A invokes a subscription identifier deconcealing function (SIDF) if the SUCI is included. The SIDF is used for deconcealing the SUPI from the SUCI. If the SUPI is included, home UDM 104A will choose the authentication method based on the subscription data. Home UDM 104A will respond with authentication challenge information in an $N_{udm}$_UE_Athentication_Get_Response message as indicated by line 5 of the message flow diagram.

In line 6 of the message flow diagram, home AUSF 112A sends an $N_{ausf}$_UE_Authentication_Authenticate_Response message with authentication challenge information through home SEPP 126A.

In lines 7 and 8 of the message flow diagram, the authenticate response message is delivered to visited AMF 110. Visited AMF 110 may forward the authentication challenge information to the UE, which calculates an authentication response. In line 9 of the message flow diagram, visited AMF and home AUSF exchange additional authentication messages before the UE is authenticated.

Once the UE is authenticated, visited AMF 110 can register as the subscriber serving AMF in home UDM 104A. The registration procedure begins in line 10 of the message flow diagram where visited AMF 110 sends a UECM_Registration_Request to home UDM 104A. In line 11, visited SEPP 126B sends the UECM_Registration_Request to home SEPP 126A. Home SEPP 126A may determine whether the UECM_Registration_Request is associated with a recent authentication from a visited network and, if not, discard the message. In this example, it is assumed that the UECM_Registration_Request is associated with a recent authentication. Accordingly, in line 12, home SEPP 126A forwards the UECM_Registration_Request to UDM 104A.

Home UDM 104A receives the UECM_Registration_Request, updates the subscriber's subscription data to include the identity of the visited AMF, and returns subscription data in a UECM_Registration_Response message in line 14 of the message flow diagram. In lines 13 through 15, the UECM_Registration_Response message is delivered to visited AMF 110.

Figure 3:
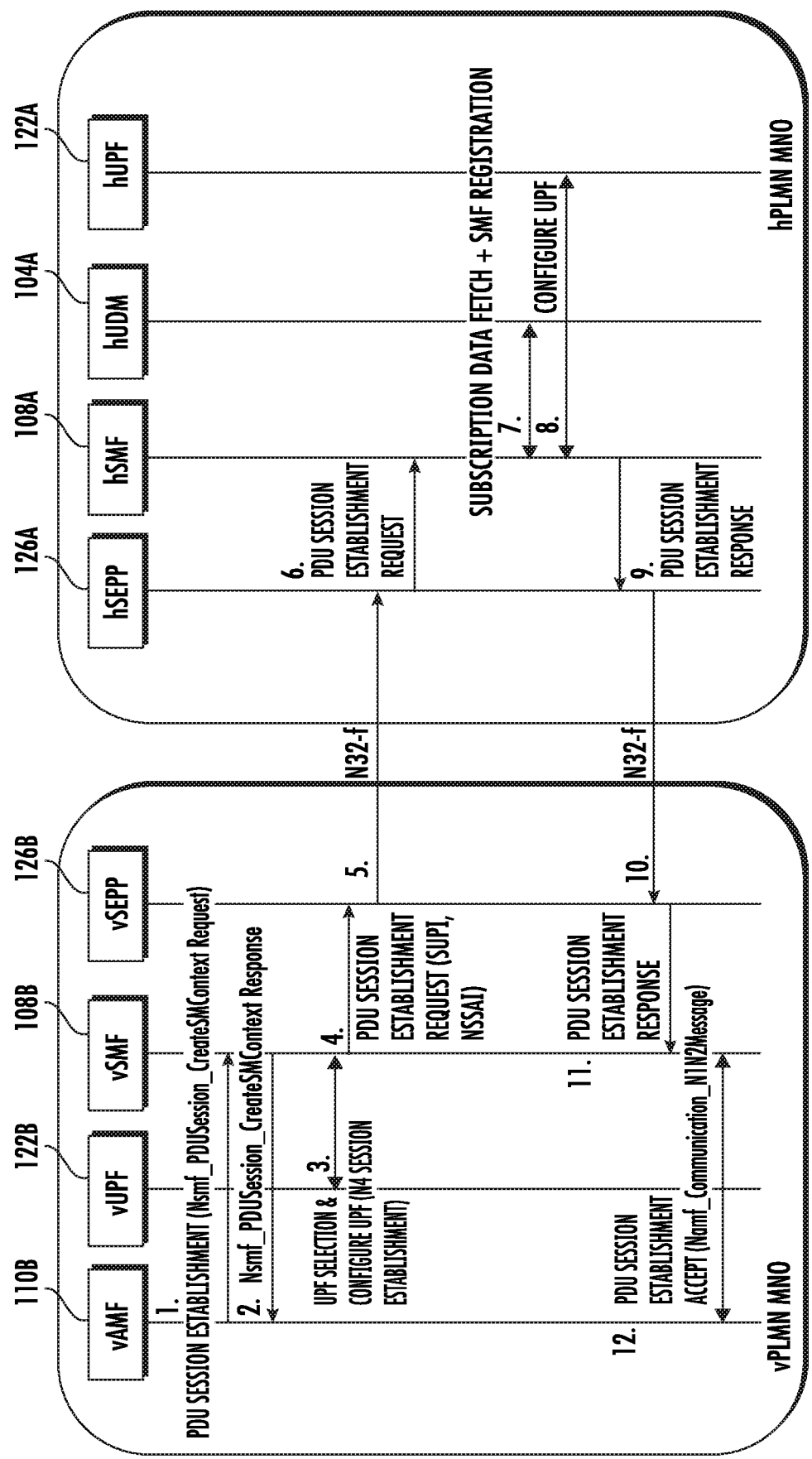
FIG. 3 is a call flow diagram illustrating PDU session establishment for an outbound roaming subscriber.

FIG. 3 is a message flow diagram illustrating exemplary messages exchange for PDU session establishment for an outbound roaming subscriber. Referring to FIG. 3 in line 1, when a UE initiates establishment of a new PDU session by sending an non-access stratum (NAS) message containing a PDU session establishment request to visited AMF 110B, visited AMF 110B selects a visited SMF 108B and sends an $N_{smf}$_PDU_Session_Create_SM_Context_Request message to visited SMF 108B.

In line 2 of the message flow diagram, visited SMF 108B responds to the $N_{smf}$_PDU_Session_Create_SM_Context_Request with an $N_{smf}$_PDU_Session_Create_SM_Context_Response message to visited AMF 110B. In line 3 of the message flow diagram, visited SMF 108B signals with visited UPF 122B for N4 session establishment.

In line 4 of the message flow diagram, visited SMF 108B sends a PDU session establishment request to visited SEPP 126B. The PDU session establishment request includes an SUPI and a network slice selection assistance information (NSSAI) parameter. In line 5, visited SEPP 126B sends the PDU session establishment request to home SEPP 126A over the N32-f interface. Home SEPP 126A does not perform authentication for the PDU session establishment request and, in line 6, forwards the PDU session establishment request to home SMF 108A. In line 7, home SMF 108A signals with home UDM 104A to obtain subscription data and the subscriber's registration information. Again, there is no security check to between home SMF 108A and home UDM 104A. Accordingly, an attacker could send the false PDU session establishment request and overwhelm the resources at home SMF 108A and home UDM 104A. In line 8 of the message flow diagram, home SMF 108A signals with home UPF 122A to configure the user plane function and N4 session. In line 9, home SMF 108A sends a PDU session establishment response to home SEPP 126A. In line 10, home SEPP 126A sends the PDU session establishment response to visited SEPP 126B over the N32-f interface. In line 11, visited SEPP 126B sends the PDU session establishment response to visited SMF 108B. In line 12, visited SMF and visited AMF 1108 signal to finalize establishment of the PDU session.

As long as PDU session establishment is legitimate, resources in the home network are not wasted by processing the PDU session establishment request. However, there are scenarios where hackers can initiate denial of service attacks by spoofing inter-PLMN messages due to a compromise in an interconnect network or a remote PLMN network. Inter-PLMN traffic can go through multiple intermediate hops or IP exchange (IPX) providers. Some mobile network operators (MNOs) can even outsource SEPP functionality to IPX providers, leaving security gaps, which may result in attacks.

As described above, hackers can initiate signaling storms of fake PDU session establishment requests for outbound roaming subscribers towards the home network SMF. The UDM does not perform any cross-verification of subscriber UE registration status (AMF registration for 3GPP access data) stored in the UDM, even though such data is received through earlier UECM registration messages from the AMF. The UDM always responds to the home SMF for SMF registration requests. As a result, both the SMF and the UDM in the home network can be overloaded due to signaling storms of fake PDU session creation requests and SMF registration requests generated by the SMF towards the UDM based on fake PDU session creation requests, leading to denial of service attacks for legitimate subscribers.

Figure 4:
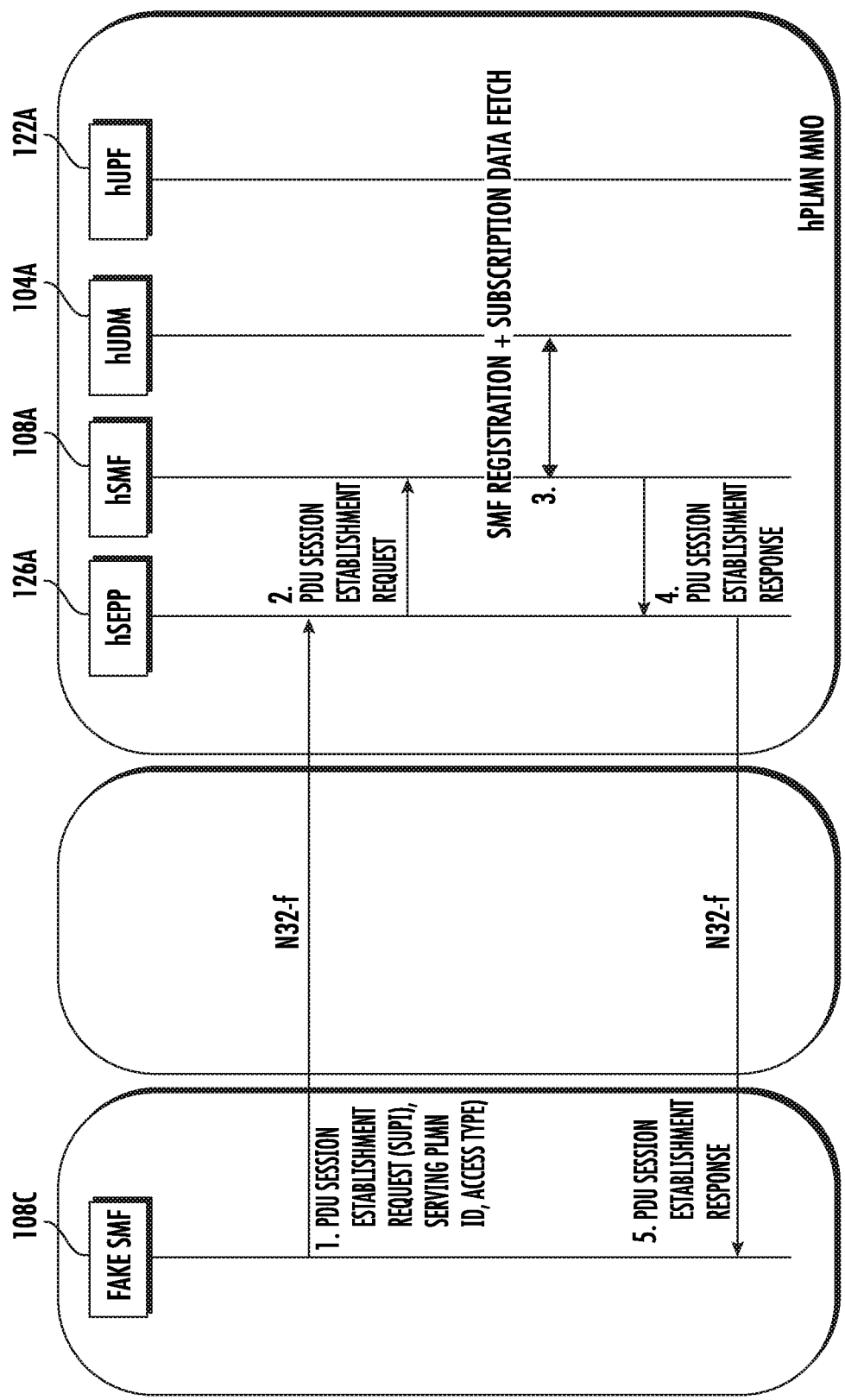
FIG. 4 is a call flow diagram illustrating a fake PDU session establishment request sent by a hacker for an outbound roaming subscriber.

FIG. 4 is a signaling message flow diagram illustrating fake PDU session establishment requests sent by a hacker for an outbound roaming subscriber. Referring to FIG. 4, in line 1, an attacker posing as an SMF, illustrated by fake SMF 108C, sends a PDU establishment request to home SEPP 126A. The PDU session establishment request includes the SUPI or SUCI, a serving PLMN ID, and an access type. These parameters may be fake or spoofed, since fake SMF 108C is not serving a real outbound roaming subscriber. Because there are no 3GPP defined security procedures for PDU session establishment requests, home SEPP 126A does not screen PDU session establishment requests to determine whether the request is fake by examining one or more of the parameter values present in the PDU session establishment request.

In line 2, home SEPP 126A forwards the fake PDU session establishment request to home SMF 108A. In line 3, home SMF 108A signals with home UDM 104A to obtain SMF registration and subscription data. In line 4, home SMF 108A generates and sends a PDU session establishment response to home SEPP 126A. The resources of home SMF 108A and home UDM 104A are consumed by processing the fake PDU session establishment request. In line 5, home SEPP 126A sends the PDU session establishment response to fake SMF 108C.

Fake SMF 108C may send a storm of PDU session establishment requests, such as that illustrated in FIG. 4, and will overwhelm home SMF 108A and home UDM 104A. No security check for the PDU session establishment request is performed based on prior registration data. To avoid these types of attacks, the subject matter described herein includes an SEPP that implements a stateful security countermeasure by correlating data extracted from UECM registration and PDU session creation messages for outbound roaming subscribers. The home network SEPP stores a record in a database upon receiving an $N_{udm}$_UECM_Registration_Request message from a visited network AMF during the UE registration process. In the record, the home SEPP may include the SUPI, the visited network PLMN ID, and the access type. When a PDU session establishment message is received, the home network SEPP may perform a lookup in the database based on the SUPI or SUCI. If no record is found or if there is a mismatch between the PLMN ID or access type, the SEPP will mark the PDU session creation request as an attack message and will reject or drop the message.

Figure 5:
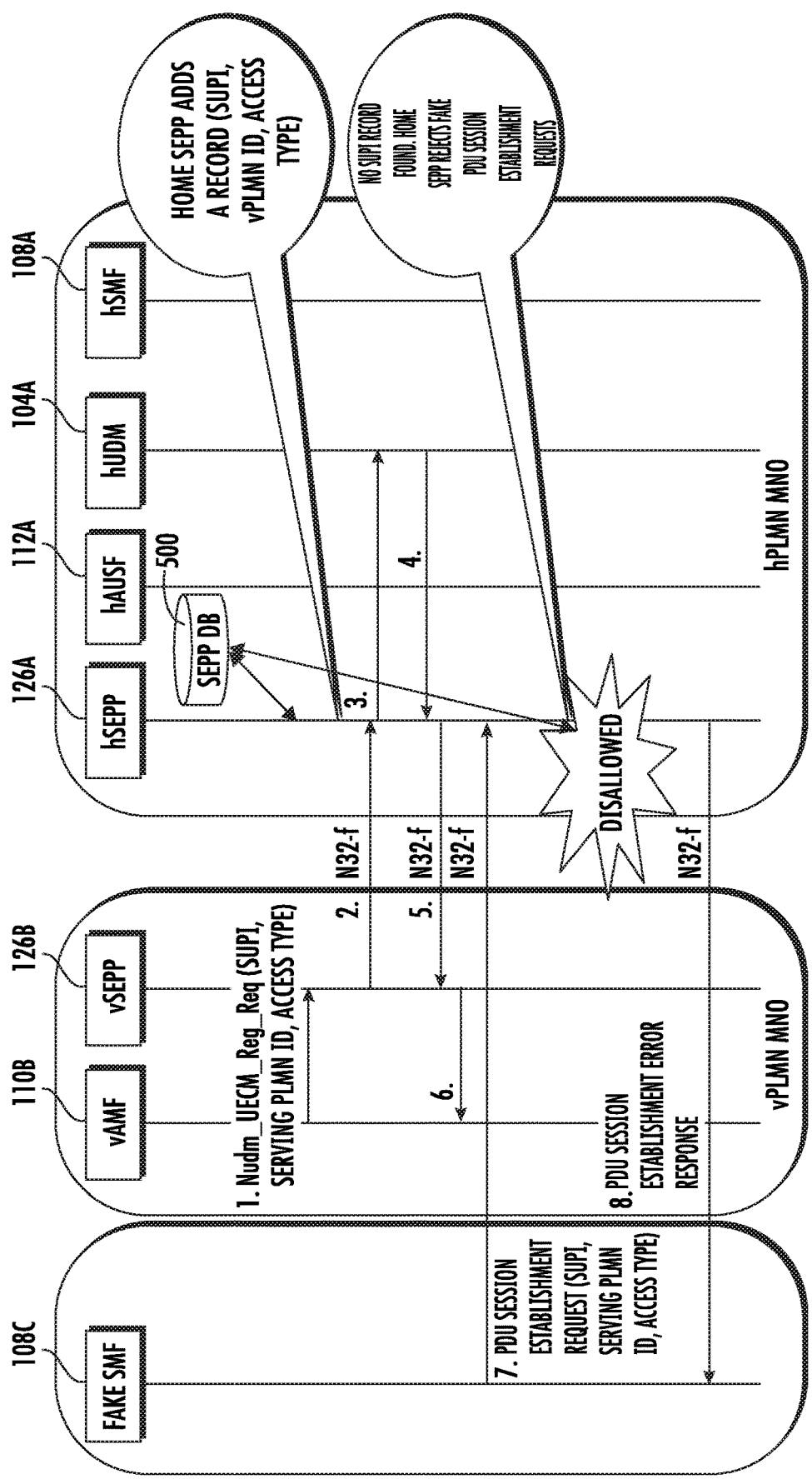
FIG. 5 is a call flow diagram illustrating UDM registration and the blocking of a fake PDU session establishment message using an SEPP.

FIG. 5 is a message flow diagram illustrating home SEPP 126A blocking a fake PDU session establishment request from an attacker using prior UE registration data. Referring to FIG. 5, in line 1, when a real subscriber registers with visited AMF 1108, visited AMF 1108 sends an $N_{udm}$_UECM_Registration_Request message to the subscriber's home network via visited SEPP 126B. In line 2, visited SEPP 126B sends the $N_{udm}$_UECM_Registration_Request message to the home network via home SEPP 126A. Home SEPP 126A creates a record in an SEPP security database 500 including the SUPI, VPLMN ID, and access type extracted from $N_{udm}$_UECM_Registration_Request message. In line 3, home SEPP 126A forwards the $N_{udm}$_UECM_Registration_Request message to home UDM 104A. In lines 4 through 6, UDM 104A sends a $N_{udm}$_UECM_Registration_Response message to the visited AMF 1108.

In line 7 of the message flow diagram, fake SMF 108C sends a fake PDU session establishment request to the home network. Home SEPP 126A receives the fake PDU session establishment request and performs a lookup in SEPP security database 500. If no SUPI record is found or if a record is found and the VPLMN ID or access type does not match the VPLMN ID and access type for an existing record for the same SUPI, home SEPP 126A disallows the PDU session establishment request, shielding home SMF 122A and home UDM 104A from unnecessary processing caused by the attack. In line 8, home SEPP 126A sends a PDU session establishment error message to fake SMF 108C. Thus, using a registration check, home SEPP 126A can reduce the effect of a signaling storm from a fake SMF by blocking fake PDU session establishment requests at the edge of the home network, shielding home SMF 122A and home UDM 104A from attack signaling traffic.

Figure 6:
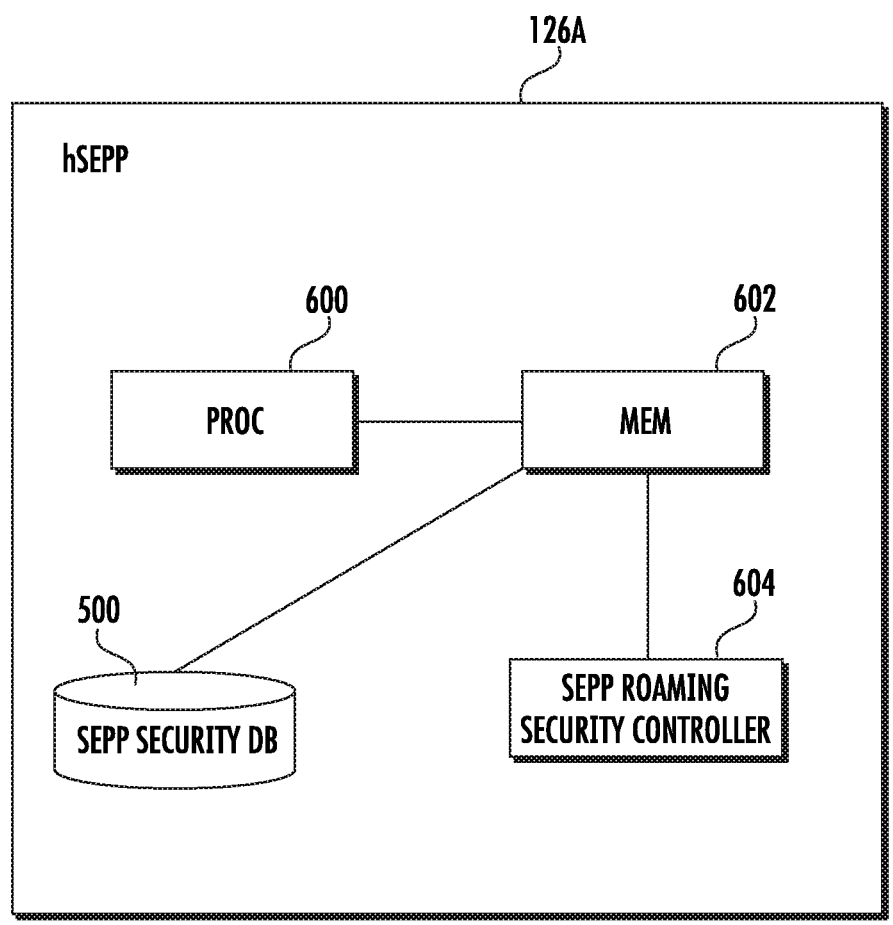
FIG. 6 is a block diagram illustrating an exemplary SEPP for mitigating 5G roaming security attacks.

FIG. 6 is a block diagram illustrating an exemplary home network SEPP for performing security checks for outbound roaming subscribers. Referring to FIG. 6, home SEPP 126A includes at least one processor 600 and memory 602. Home SEPP 126A further includes an SEPP roaming security controller 604 that may be implemented using computer executable instructions stored in memory 602 and executable by processor 600. Home SEPP 126A also includes SEPP security database 500, which stores records derived from registration messages for outbound roaming subscribers and used to block the fake PDU session establishment requests that may be part of a denial of service attack. SEPP roaming security controller 604 may receive registration messages relating to outbound roaming subscribers, extract registration information from the messages, and use the registration information to create outbound roaming UE registration records in SEPP security database 500. Such records may include the SUCI and/or the SUPI, VPLMN ID, and the access type. Table 1 shown below illustrates an example of a UE registration record that may be created in database 500.

TABLE 1

Outbound subscriber Roaming UE Registration Record

| SUPI or SUCI | VPLMN ID | Access Type |
|---|---|---|
| SUPI 1 | VPLMN ID xyz | 3GPP |

In Table 1, the outbound roaming subscriber registration record includes parameters that are usable to verify whether subsequent messages, such as PDU session establishment messages, are legitimate or not. In the illustrated example, these parameters include the SUPI or SUCI, the VPLMN ID, and the access type. It is understood that additional or alternate parameters derived from an $N_{udm}$_UECM_Registration_Request message may be used without departing from the scope of the subject matter described herein. An attacker seeking to overwhelm the resources of the home network may not have access to legitimate UE registration information. As a result, when home SEPP 126A performs a look up in database 500 and fails to locate a matching record, the PDU session establishment request for the fake subscriber will be blocked by the home SEPP and prevented from entering the home network.

Figure 7:
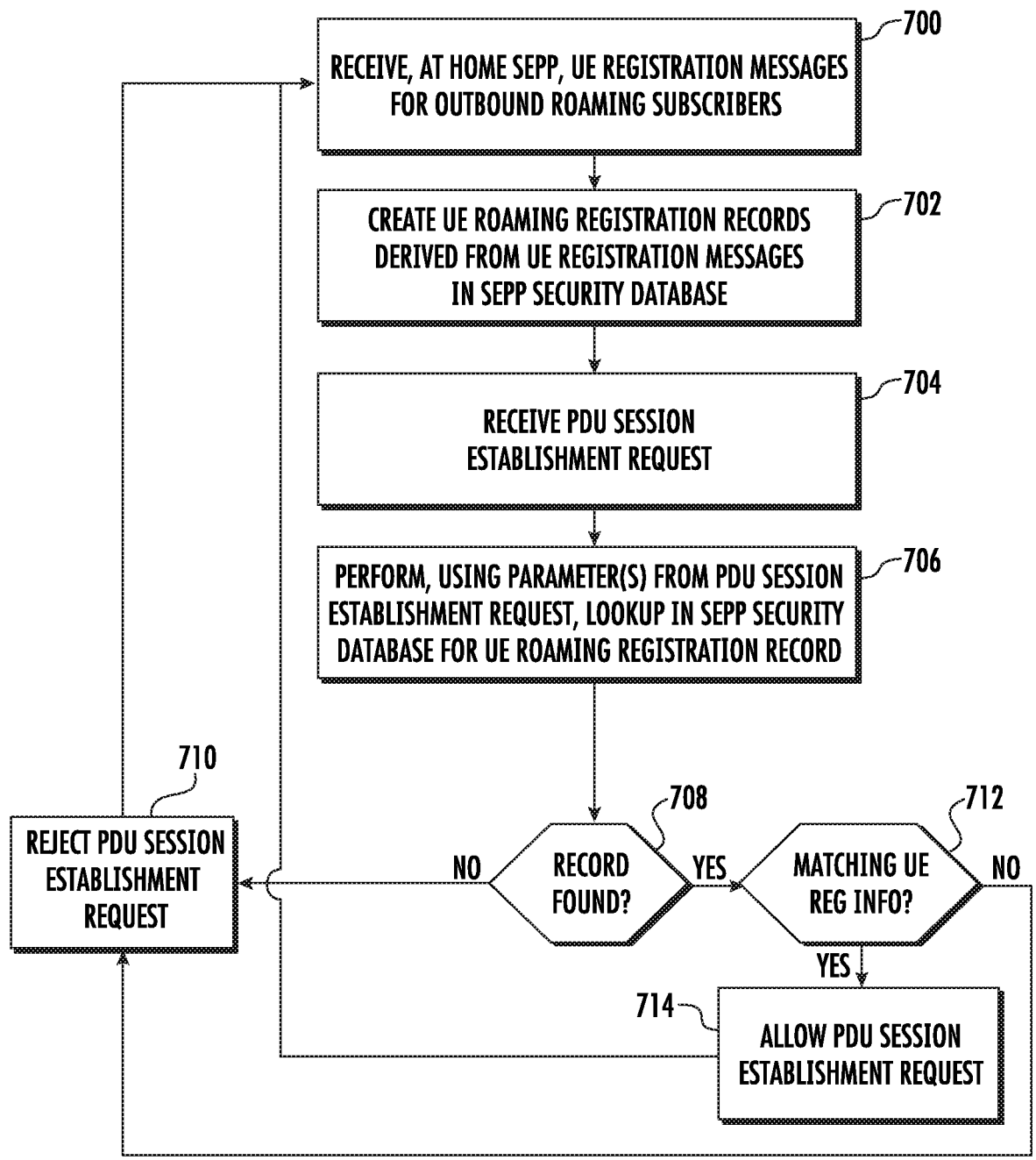
FIG. 7 is a flow chart illustrating an exemplary process for mitigating 5G roaming security attacks using an SEPP.

FIG. 7 is a flow chart illustrating an exemplary process for mitigating 5G roaming security attacks using an SEPP. Referring to FIG. 7, in step 700, the process includes receiving, at a home SEPP, UE registration messages for outbound roaming subscribers. For example, home SEPP 126A may receive $N_{udm}$_UE_Registration_Request messages for outbound roaming subscribers. The $N_{udm}$_UE_Registration_Request messages may include the SUPI or SUCI, the serving PLMN ID, and the access type. $N_{udm}$_UE_Registration_Request messages may originate from AMF located in networks where subscribers are roaming.

In step 702, the process includes creating UE roaming registration records in SEPP security database 500 using information derived from the UE registration messages in the SEPP security database. For example, home SEPP 126A may create UE roaming registration records, such as the record illustrated above in Table 1, that contain the SUPI or SUCI, the VPLMN ID, and the access type obtained from $N_{udm}$_UE_Registration_Request messages.

In step 704, the process includes receiving a PDU session establishment request. For example, home SEPP 126A may receive PDU session establishment request from a real SMF serving a legitimate outbound roaming subscriber or from an attacker posing as a real SMF.

In step 706, the process includes performing, using one or more parameters from the PDU session establishment request, a lookup in the SEPP security database for a matching UE roaming registration record. For example, SEPP roaming security controller 604 may extract the SUPI or SUCI from the PDU session establishment request and perform a lookup in SEPP security database 500 using the SUPI or SUCI.

In step 708, the process includes determining whether a record is found. For example, SEPP roaming security controller 604 may determine whether or not a record corresponding to the SUPI or SUCI exits in roaming security database 500.

If no record is found, control proceeds to step 710 where the PDU session establishment request is rejected as fake. Rejecting the PDU session establishment request may occur at home SEPP 126A and may prevent fake PDU session establishment requests from affecting nodes, such as home UDM 104A and home SMF 122A in the home network. Rejecting fake PDU session establishment requests may include discarding the fake PDU session establishment requests and sending an error message to the sender.

Returning to step 708, if a record corresponding to the SUPI or SUCI from the PDU session establishment request is found in SEPP security database 500, control proceeds to step 712 where it is determined whether the record includes matching UE registration information. For example, roaming security controller 604 of home SEPP 126A may locate a record corresponding to the SUPI or SUCI in the PDU session establishment request. If the remaining parameters in the PDU session establishment request match the corresponding parameters in the record, control proceeds to step 714 where the PDU session establishment request is allowed to enter the home network. In such a case, home SEPP 126A may forward the PDU session establishment request to home SMF 108A. Home SMF 108A may obtain the corresponding registration information from home UDM 104A. Home SMF 108A may respond to the PDU session establishment request by sending a message to home SEPP 126A indicating successful PDU session establishment. Home SEPP 126A may forward the PDU session establishment response to the visited network. In the visited network, the PDU session establishment response is forwarded to the AMF where the subscriber is currently registered.

In step 712, if the parameters in the PDU session establishment request do not match the parameters in the corresponding record in database 500, control proceeds to step 710 where the PDU session establishment requested is rejected. The process in FIG. 7 may be performed continually to protect the home network against denial of service attacks while allowing PDU session establishment requests from legitimate outbound roaming subscribers.

The proposed solution mitigates the DoS security attacks initiated through fake PDU session establishment requests using an SEPP. The solution reduces the likelihood of overloading of the home network SMF and UDM handling PDU session establishment and SMF registration messages. The solution avoids unnecessary subsequent signaling traffic at the SMF and UDM to free resources caused by fake PDU session establishment requests.

The proposed solution allows MNOs to mitigate DoS attacks due to roaming PDU session creation signaling for outbound roaming subscribers and protect 5G core NFs (SMFs and UDMs) using a proposed security countermeasure at the SEPP by correlating UECM registration and PDU session creation signaling related to outbound roaming subscribers.

The disclosure of each of the following references is hereby incorporated herein by reference in its entirety.

REFERENCES

3GPP TS 33.501, $3^{rd}$ Generation Partnership Project; Technical Specification Group Services and System Aspects; Security architecture and procedures for 5G system (Release 16) V16.2.0, (2020-03).
3GPP TS 33.517, $3^{rd}$ Generation Partnership Project; Technical Specification Group Services and System Aspects; 5G Security Assurance Specification (SCAS) for the Security Edge Protection Proxy (SEPP) network product class (Release 16) V16.1.0 (2019-12).
3GPP TS 23.502, Technical Specification Group Services and System Aspects; Procedures for the 5G System (5Gs), Stage 2, (Release 16) V16.4.0 (2020-03).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method tor mitigating a 5G roaming attack using a security edge protection proxy (SEPP), the method comprising:
receiving, at an SEPP, user equipment (UE) registration messages for outbound roaming subscribers, wherein receiving the UE registration messages for the outbound roaming subscribers includes receiving $N_{udm}$_UECM_Registration messages from access and mobility management functions (AMFs) and session management functions (SMFs) serving the outbound roaming subscribers;
creating, in a SEPP security database, UE roaming registration records derived from UE registration messages;
receiving, at the SEPP, a packet data unit (PDU) session establishment request message;

performing, using at least one parameter value extracted from the PDU session establishment request message, a lookup in the SEPP security database for a UE roaming registration record; and determining, by the SEPP and based on results of the lookup, whether to allow or reject the PDU session establishment request message.

2. The method of claim 1 wherein creating records in the SEPP security database includes creating records that each include a subscription permanent identifier (SUPI) or subscription concealed identifier (SUCI), serving public land mobile network (PLMN) ID, and access type.

3. A method for mitigating a 5G roaming attack using a security edge protection proxy (SEPP), the method comprising:

receiving, at an SEPP, user equipment (UE) registration messages for outbound roaming subscribers;

creating, in a SEPP security database, UE roaming registration records derived from UE registration messages, wherein creating records in the SEPP security database includes creating records that each include a subscription permanent identifier (SUPI) or subscription concealed identifier (SUCI), serving public land mobile network (PLMN) ID, and access type;

receiving, at the SEPP, a packet data unit (PDU) session establishment request message, wherein receiving a PDU session establishment request message includes receiving a PDU session establishment request message including a SUPI or SUCI, a PLMN ID, and an access type;

performing, using at least one parameter value extracted from the PDU session establishment request message, a lookup in the SEPP security database for a UE roaming registration record; and determining, by the SEPP and based on results of the lookup, whether to allow or reject the PDU session establishment request message.

4. The method of claim 3 wherein performing the lookup in the SEPP security database include performing the lookup using the SUPI or SUCI from the PDU session establishment request message.

5. The method of claim 4 comprising failing to locate a record corresponding to the SUPI or SUCI from the PDU session establishment request message in the SEPP security database, wherein determining whether to allow or reject the PDU session establishment request message includes determining to reject the PDU session establishment request message, and further comprising rejecting the PDU session establishment request message.

6. The method of claim 4 comprising locating a record corresponding to the SUPI or SUCI from the PDU session establishment request message in the SEPP security database, determining that a PLMN ID or an access type in the record does not match the PLMN ID or the access type in the PDU session establishment request message, wherein determining whether to allow or reject the PDU session establishment request message includes determining to reject the PDU session establishment request, and further comprising rejecting the PDU session establishment request message.

7. The method of claim 6 wherein rejecting the PDU session establishment request message includes discarding the PDU session establishment request message and sending a PDU session establishment error response.

8. The method of claim 4 comprising locating a record corresponding to the SUPI or SUCI from the PDU session establishment request message in the SEPP security database, determining that a PLMN ID and an access type in the record does match the PLMN ID and the access type in the PDU session establishment request message, wherein determining whether to allow or reject the PDU session establishment request message includes determining to allow the PDU session establishment request message, and further comprising allowing the PDU session establishment request message.

9. The method of claim 8 wherein allowing the PDU session establishment request message includes forwarding the PDU session establishment request message from the SEPP to a home session management function (hSMF).

10. A system for mitigating a 5G roaming attack, the system comprising:

a security edge protection proxy (SEPP) including at least one processor and a memory;

an SEPP security database implemented in the memory;

an SEPP roaming security controller implemented by the at least one processor for receiving user equipment (UE) registration messages for outbound roaming subscribers;

creating, in the SEPP security database, UE roaming registration records derived from UE registration messages;

receiving a packet data unit (PDU) session establishment request message;

performing, using at least one parameter value extracted from the PDU session establishment request message, a lookup in the SEPP security database for a UE roaming registration record;

determining, by the SEPP and based on results of the lookup, whether to allow or reject the PDU session establishment request message; and wherein the SEPP roaming security controller is configured to receive Nudm_UECM_Registration messages from access and mobility management functions (AMFs) and session management functions (SMFs) serving the outbound roaming subscribers.

11. The system of claim 10 wherein the SEPP roaming security controller is configured to create the records in the SEPP security database where each includes a subscription permanent identifier (SUPI) or subscription concealed identifier (SUCI), serving public land mobile network (PLMN) ID, and access type.

12. A system for mitigating a 5G roaming attack, the system comprising:

a security edge protection proxy (SEPP) including at least one processor and a memory;

an SEPP security database implemented in the memory;

an SEPP roaming security controller implemented by the at least one processor for receiving user equipment (UE) registration messages for outbound roaming subscribers;

creating, in the SEPP security database, UE roaming registration records derived from UE registration messages;

receiving a packet data unit (PDU) session establishment request message;

performing, using at least one parameter value extracted from the PDU session establishment request message, a lookup in the SEPP security database for a UE roaming registration record;

determining, by the SEPP and based on results of the lookup, whether to allow or reject the PDU session establishment request message;

wherein the SEPP roaming security controller is configured to create the records in the SEPP security database where each includes a subscription permanent identifier (SUPI) or subscription concealed identifier (SUCI), serving public land mobile network (PLMN) ID, and access type; and wherein the PDU session establishment request message includes a SUPI or SUCI, a PLMN ID, and an access type.

13. The system of claim 12 wherein the SEPP roaming security controller is configured to perform the lookup in the SEPP security database using the SUPI or SUCI from the PDU session establishment request message.

14. The system of claim 13 wherein the SEPP roaming security controller is configured to, in response to failing to locate a record corresponding to the SUPI or SUCI from the PDU session establishment request message in the SEPP security database, reject the PDU session establishment request message.

15. The system of claim 13 wherein the SEPP roaming security controller is configured to, in response to locating a record corresponding to the SUPI or SUCI from the PDU session establishment request message in the SEPP security database and determining that a PLMN ID or an access type in the record does not match the PLMN ID or the access type in the PDU session establishment request message, reject the PDU session establishment request message.

16. The system of claim 15 wherein the SEPP roaming security controller is configured to reject the PDU session establishment request message by discarding the PDU session establishment request message and sending a PDU session establishment error response.

17. The system of claim 13 wherein the SEPP roaming security controller is configured to, in response to locating a record corresponding to the SUPI or SUCI from the PDU session establishment request message in the SEPP security database, determining that a PLMN ID and an access type in the record matches the PLMN ID and the access type in the PDU session establishment request message, allow the PDU session establishment request message, wherein allowing the PDU session establishment request message includes forwarding the PDU session establishment request message from the SEPP to a home session management function (hSMF).

18. A non-transitory computer readable medium having stored thereon executable instructions that when executed by a processor of a computer control the computer to perform steps comprising:

receiving, at a security edge protection proxy (SEPP), user equipment (UE) registration messages for outbound roaming subscribers, wherein receiving the UE registration messages for the outbound roaming subscribers includes receiving $N_{udm}$_UECM_Registration messages from access and mobility management functions (AMFs) and session management functions (SMFs) serving the outbound roaming subscribers;

creating, in a SEPP security database, UE roaming registration records derived from UE registration messages;

receiving, at the SEPP, a packet data unit (PDU) session establishment request message;

performing, using at least one parameter value extracted from the PDU session establishment request message, a lookup in the SEPP security database for a UE roaming registration record; and determining, by the SEPP and based on results of the lookup, whether to allow or reject the PDU session establishment request message.

* * * * *

UNITED STATES PATENT AND TRADEMARK OFFICE
CERTIFICATE OF CORRECTION

PATENT NO. : 11,553,342 B2
APPLICATION NO. : 16/929048
DATED : January 10, 2023
INVENTOR(S) : Mahalank et al.

It is certified that error appears in the above-identified patent and that said Letters Patent is hereby corrected as shown below:

On the Title Page

On page 6, Column 1, item (56) under Other Publications, Line 19, delete "SLS" and insert -- SLs --, therefor.

On page 6, Column 1, item (56) under Other Publications, Line 34, delete ""Digitial" and insert -- "Digital --, therefor.

On page 6, Column 1, item (56) under Other Publications, Line 60, delete "Monile" and insert -- Mobile --, therefor.

On page 6, Column 1, item (56) under Other Publications, Line 61, delete "stagel" and insert -- stage1 --, therefor.

On page 6, Column 2, item (56) under Other Publications, Line 21, delete "SmartMeters" and insert -- Smart Meters --, therefor.

On page 6, Column 2, item (56) under Other Publications, Line 38, delete "Internatioanl" and insert -- International --, therefor.

In the Drawings

On sheet 4 of 7, in FIG. 4, below Reference Numeral 108C, Line 6, delete "ACCESS TYPE)" and insert -- ACCESS TYPE --, therefor.

In the Specification

In Column 8, Line 52, delete "1108" and insert -- 110B --, therefor.

In Column 9, Line 62, delete "1108," and insert -- 110B, --, therefor.

Signed and Sealed this
Seventeenth Day of October, 2023

Katherine Kelly Vidal
*Director of the United States Patent and Trademark Office*

In Column 9, Line 62, delete "1108" and insert -- 110B --, therefor.

In Column 10, Line 7, delete "1108." and insert -- 110B. --, therefor.

In the Claims

In Column 12, Line 52, in Claim 1, delete "tor" and insert -- for --, therefor.

In Column 14, Line 34, in Claim 10, delete "Nudm_" and insert -- $N_{udm\_}$ --, therefor.